United States Patent
Kaplanyan et al.

(10) Patent No.: US 11,037,531 B2
(45) Date of Patent: Jun. 15, 2021

(54) NEURAL RECONSTRUCTION OF SEQUENTIAL FRAMES

(71) Applicant: Facebook Technologies, LLC, Menlo Park, CA (US)

(72) Inventors: Anton S. Kaplanyan, Redmond, WA (US); Jiahao Lin, Redmond, WA (US); Mikhail Okunev, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/662,725

(22) Filed: Oct. 24, 2019

(65) Prior Publication Data
US 2021/0125583 A1    Apr. 29, 2021

(51) Int. Cl.
*G09G 5/37*    (2006.01)
*G06N 20/00*    (2019.01)

(52) U.S. Cl.
CPC ............... *G09G 5/37* (2013.01); *G06N 20/00* (2019.01); *G09G 2320/10* (2013.01); *G09G 2340/0407* (2013.01); *G09G 2340/16* (2013.01)

(58) Field of Classification Search
CPC .......... G09G 5/37; G09G 2320/10; G09G 2340/0407; G09G 2340/16; G06N 20/00
See application file for complete search history.

(56) References Cited

U.S. PATENT DOCUMENTS

| | | | |
|---|---|---|---|
| 2004/0042662 A1 | 3/2004 | Wilensky | |
| 2012/0008844 A1* | 1/2012 | Bilgin | H04N 19/577 382/131 |
| 2012/0051432 A1* | 3/2012 | Fernandes | H04N 19/156 375/240.16 |
| 2016/0239711 A1 | 8/2016 | Gong | |
| 2016/0364846 A1* | 12/2016 | Paris | G06T 5/002 |
| 2017/0171525 A1* | 6/2017 | Koehle | H04N 13/204 |
| 2018/0007269 A1 | 1/2018 | Sclar | |
| 2018/0129902 A1 | 5/2018 | Li | |
| 2018/0137389 A1* | 5/2018 | Mathieu | G06K 9/00718 |
| 2019/0073787 A1* | 3/2019 | Lee | G06T 7/70 |
| 2019/0166359 A1* | 5/2019 | Lapstun | H04N 13/307 |
| 2019/0206026 A1* | 7/2019 | Vemulapalli | G06N 20/00 |

(Continued)

OTHER PUBLICATIONS

International Search Report and Written Opinion for International Application No. PCT/US2018/061942, dated Jun. 20, 2019.

(Continued)

*Primary Examiner* — Abderrahim Merouan
(74) *Attorney, Agent, or Firm* — Baker Botts L.L.P.

(57) ABSTRACT

In one embodiment, a computing system configured to generate a current frame may access a current sample dataset having incomplete pixel information of a current frame in a sequence of frames. The system may access a previous frame in the sequence of frames with complete pixel information. The system may further access a motion representation indicating pixel relationships between the current frame and the previous frame. The previous frame may then be transformed according to the motion representation. The system may generate the current frame having complete pixel information by processing the current sample dataset and the transformed previous frame using a first machine-learning model.

20 Claims, 13 Drawing Sheets

(56) References Cited

U.S. PATENT DOCUMENTS

| | | | |
|---|---|---|---|
| 2019/0281279 A1* | 9/2019 | Peuhkurinen | H04N 9/3194 |
| 2019/0362157 A1* | 11/2019 | Cambias | G06K 9/6256 |
| 2019/0370980 A1* | 12/2019 | Hollander | G06K 9/00771 |

OTHER PUBLICATIONS

Kaplanyan, et al., DeepFovea: Neural Reconstruction for Foveated Rendering and Video Compression using Learned Statistics of Natural Videos, ACM Trans. Graph., vol. 38, No. 4, Article 212. pp. 1-13, Jul. 2019, pp. 1-13, Abu-El-Haija, et al., YouTube-8M: A Large-Scale Video Classification Benchmark, arXiv:1609.08675v1, [cs.CV], Sep. 27, 2016, pp. 1-10.

Arjovsky, et al., Wasserstein Generative Adversarial Networks, Proceedings of the 34th International Conference on Machine Learning, vol. 70, pp. 1-10, 2017.

Ba, et al., Layer Normalization, arXiv:1607.06450v1, [stat.ML], Jul. 21, 2016, pp. 1-14.

Bampis, et al., Towards Perceptually Optimized End-to-end Adaptive Video Streaming, arXiv:1808.03898v1, [eess.IV], Aug. 12, 2018, pp. 1-16.

Bansal, et al., Recycle-GAN: Unsupervised Video Retargeting, Proc. European Conference on Computer Vision, 2018, pp. 1-17.

Bradley, et al., Retina-V1 Model of Detectability Across the Visual Field, Journal of Vision (2014), 14(12):22, pp. 1-22. Oct. 21, 2014.

Chaitanya, et al., Interactive Reconstruction of Monte Carlo Image Sequences Using a Recurrent Denoising Autoencoder, ACM Transactions on Graphics, vol. 36, No. 4, Article 98, Jul. 2017, pp. 1-14.

Chen, et al., Photographic Image Synthesis with Cascaded Refinement Networks, arXiv:1707.09405v1, [cs.CV], Jul. 28, 2017, pp. 1-10.

Choi, et al., Video Quality Assessment Accounting for Temporal Visual Masking of Local Flicker, Signal Processing: Image Communication, 67, (2018), pp. 182-198.

Clevert, et al., Fast and Accurate Deep Network Learning by Exponential Linear Units (ELUs), arXiv:1511.07289v5, [cs.LG], Feb. 22, 2016, pp. 1-14.

Cook, et al., Stochastic Sampling in Computer Graphics, ACM Transactions on Graphics, vol. 5, No. 1, Jan. 1986, pp. 51-72.

Curcio, et al., Human Photoreceptor Topography, Journal of Comparative Neurology, 292, (1990), pp. 497-523.

Dacey, et al., Dendritic Field Size and Morphology of Midget and Parasol Ganglion Cells of the Human Retina, Proceedings of the National Academy of Sciences vol. 89, Oct. 1992, pp. 9666-9670.

Geisler., Visual Perception and the Statistical Properties of Natural Scenes, Annu. Rev. Psychol., 59, (2008), pp. 167-192.

Geisler, et al., A Real-Time Foveated Multiresolution System for Low-Bandwidth Video Communication, SPIE Proceedings, pp. 3299-3299, 1998.

Girshick, et al., Rich Feature Hierarchies for Accurate Object Detection and Semantic Segmentation, Proc. Conf. Computer Vision and Pattern Recognition, (2014), pp. 1-8.

Goodfellow, et al., Generative Adversarial Networks, arXiv:1406.2661v1, [stat.ML], Jun. 10, 2014, pp. 1-9.

Guenter, et al., Foveated 3D Graphics, ACM Transactions on Graphics, vol. 31, No. 6, Article 164, Nov. 2012, pp. 1-10.

Haglund, et al., The SVT High Definition Multi Format Test Set, (Feb. 2006), pp. 1-8.

He, et al., Deep Residual Learning for Image Recognition, IEEE Conference on Computer Vision and Pattern Recognition, (2016), pp. 770-778.

He, et al., Extending the Graphics Pipeline with Adaptive, Multi-Rate Shading, pp. 1-12, 2014.

Hochreiter, et al., Long Short-Term Memory, Neural Computation 9, 8 (1997), 1735-1780, pp. 1-32.

Ilg, et al., FlowNet 2.0: Evolution of Optical Flow Estimation with Deep Networks, in Proc. Conf. Computer Vision and Pattern Recognition, http://lmb.informatik.uni-freiburg.de//Publications/_2017/IMKDB17, pp. 2462-2470, 2017.

Isola, et al., Image-to-Image Translation with Conditional Adversarial Networks, Proc. Conf. Computer Vision and Pattern Recognition, (2017), pp. 1125-1134.

Karras, et al., Progressive Growing of GANs for Improved Quality, Stability, and Variation, International Conference on Learning Representations, arXiv:1710.10196v3, [cs.NE], Feb. 26, 2018, pp. 1-26.

Kelly., Retinal Inhomogeneity. I. Spatiotemporal Contrast Sensitivity, vol. 1, No. 1, Jan. 1984, J. Opt. Soc. Am. A, pp. 107-113.

Kingma, et al., Adam: A Method for Stochastic Optimization, arXiv:1412.6980v9, [cs.LG], Jan. 30, 2017, pp. 1-15.

Krizhevsky, et al., ImageNet Classification with Deep Convolutional Neural Networks, pp. 1-9, Jan. 2012.

Kundu, et al., Full-Reference Visual Quality Assessment for Synthetic Images: A Subjective Study, (2015), pp. 1-5.

Lecun, et al., Gradient-Based Learning Applied to Document Recognition, Proc. IEEE, Nov. 1998, pp. 1-46.

Ledig, et al., Photo-Realistic Single Image Super-Resolution Using a Generative Adversarial Network, Proc. Conf. Computer Vision and Pattern Recognition, pp. 4681-4690, 2017.

Lee, et al., Foveated Video Compression with Optimal Rate Control, IEEE Transactions on Image Processing, vol. 10, No. 7, Jul. 2001, pp. 977-992.

Li, et al., Precomputed Real-Time Texture Synthesis with Markovian Generative Adversarial Networks, arXiv:1604.04382v1, [cs.CV], Apr. 15, 2016, pp. 1-17.

Liu, et al., Image Inpainting for Irregular Holes Using Partial Convolutions, arXiv:1804.07723v2, [cs.CV], Dec. 15, 2018, pp. 1-23.

Mantiuk, et al., HDR-VDP-2: A Calibrated Visual Metric for Visibility and Quality Predictions in All Luminance Conditions, in ACM Transactions on Graphics (TOG), vol. 30. ACM, 40:1-13, Jul. 2011.

Mitchell, et al., Spectrally Optimal Sampling for Distribution Ray Tracing, Computer Graphics, 25(4):157-164, Jul. 1991.

Miyato, et al., Spectral Normalization for Generative Adversarial Networks, arXiv:1802.05957v1, Published as a conference paper at ICLR 2018, pp. 1-26, Feb. 16, 2018.

Pathak, et al., Context Encoders: Feature Learning by Inpainting, in Proc. Conf. Computer Vision and Pattern Recognition, pp. 2536-2544, 2016.

Patney, et al., Towards Foveated Rendering for Gaze-tracked Virtual Reality, ACM Trans. Graph. (Proc. SIGGRAPH Asia) 35, 6, Article 179 (Nov. 2016), pp. 179:1-179:12.

Perez-Pellitero, et al., Photorealistic Video Super Resolution, arXiv:1807.07930v2, pp. 1-10, May 2, 2019.

Pinson, et al., A New Standardized Method for Objectively Measuring Video Quality, pp. 1-12, 2004.

Rimac-Drlje, et al., Foveation-based Content Adaptive Structural Similarity Index, International Conference on Systems, Signals and Image Processing (2011), pp. 1-4.

Rippel, et al., Learned Video Compression, arXiv:1811.06981v1, pp. 1-11, Nov. 16, 2018.

Robson., Spatial and Temporal Contrast—Sensitivity Functions of the Visual System, pp. 1141-1142, Aug. 1966.

Ronneberger, et al., U-Net: Convolutional Networks for Biomedical Image Segmentation, arXiv:1505.04597v1, [cs.CV], pp. 1-8, May 18, 2015.

Rovamo, et al., Temporal Integration and Contrast Sensitivity in Foveal and Peripheral Vision, Perception 13, pp. 665-674, 1984.

Ruderman, et al., The Statistics of Natural Images, Network: Computation in Neural Systems 5, 4 (1994), pp. 517-548, 1994.

Schmidhuber, et al., Deep Learning in Neural Networks: An overview, arXiv:1404.7828v4, pp. 1-88, Oct. 8, 2014.

Seshadrinathan, et al., Study of Subjective and Objective Quality Assessment of Video, IEEE Transactions on Image Processing 19(6):1427-1441, Jun. 6, 2010.

Shi, et al., Convolutional LSTM Network: A Machine Learning Approach for Precipitation Nowcasting, arXiv:1506.04214v1, [cs.CV], Jun. 13, 2015, pp. 1-11.

(56) References Cited

OTHER PUBLICATIONS

Simonyan, et al., Very Deep Convolutional Networks for Large-Scale Image Recognition, arXiv:1409.1556v6, Published as a conference paper at ICLR 2015, pp. 1-14, Apr. 10, 2015.
Soundararajan, et al., Video Quality Assessment by Reduced Reference Spatio-Temporal Entropic Differencing, IEEE Transactions on Circuits and Systems for Video Technology 23(4):684-694, Apr. 2013.
Stengel, et al., Adaptive Image-Space Sampling for Gaze-Contingent Real-time Rendering. Computer Graphics Forum (Proc. of Eurographics Symposium on Rendering) 35(4):129-139, 2016.
Sun, et al., Perceptually-guided Foveation for Light Field Displays, ACM Trans. Graph. (Proc. SIGGRAPH) 36, 6, Article 192 (2017), pp. 192:1-192:13, Nov. 2017.
Swafford, et al., User, Metric, and Computational Evaluation of Foveated Rendering Methods, Proc. ACM Symposium on Applied Perception (2016), pp. 1-8.
Ulichney, et al., Void-and-cluster Method for Dither Array Generation, in Human Vision, Visual Processing, and Digital Display IV, vol. 1913. International Society for Optics and Photonics, pp. 332-343, 1993.
Vlachos, et al., Advanced VR Rendering, http://media.steampowered.com/apps/valve/2015/Alex_Vlachos_Advanced_VR_Rendering_GDC2015.pdf, Game Developers Conference Talk, pp. 1-67, Mar. 2015.
Wang, et al., Video-to-Video Synthesis, arXiv:1808.06601v2, pp. 1-14, Dec. 3, 2018.
Wang, et al., Foveated Wavelet Image Quality Index, pp. 1-12.
Wang, et al., Image Quality Assessment: From Error Visibility to Structural Similarity, IEEE Transactions on Image Processing, 13(4):1-14, Apr. 2004.
Wang, et al., Foveation Scalable Video Coding with Automatic Fixation Selection, IEEE Transactions on Image Processing, 12(2):1-12, Feb. 2003.
Weier, et al., Foveated Real-Time Ray Tracing for Head-Mounted Displays. Computer Graphics Forum 35, pp. 1-10, 2016.
Weier, et al., Perception-driven Accelerated Rendering, Computer Graphics Forum, 36(2): 1-33, 2017.
Ye, et al., Algorithm Descriptions of Projection Format Conversion and Video Quality Metrics in 360Lib, Joint Video Exploration Team of ITU-T SG 16, pp. 1-46, 2017.
Zhang, et al., The Unreasonable Effectiveness of Deep Features as a Perceptual Metric, in Proc. CVPR, pp. 1-10, 2018.

* cited by examiner

NEURAL RECONSTRUCTION OF SEQUENTIAL FRAMES

TECHNICAL FIELD

This disclosure generally relates to machine-learning, computer graphics, and image compression.

BACKGROUND

In order to provide an immersive visual experience, modern displays require head mounting, high image resolution, low latency, as well as high refresh rate. This poses a challenging computational problem. On the other hand, the human visual system can consume only a tiny fraction of this video stream due to the drastic acuity loss in the peripheral vision. Foveated rendering and compression can save computations by reducing the image quality in the peripheral vision. However, this can cause noticeable artifacts in the periphery, or, if done conservatively, would provide only modest computational savings.

SUMMARY OF PARTICULAR EMBODIMENTS

Figure 1:
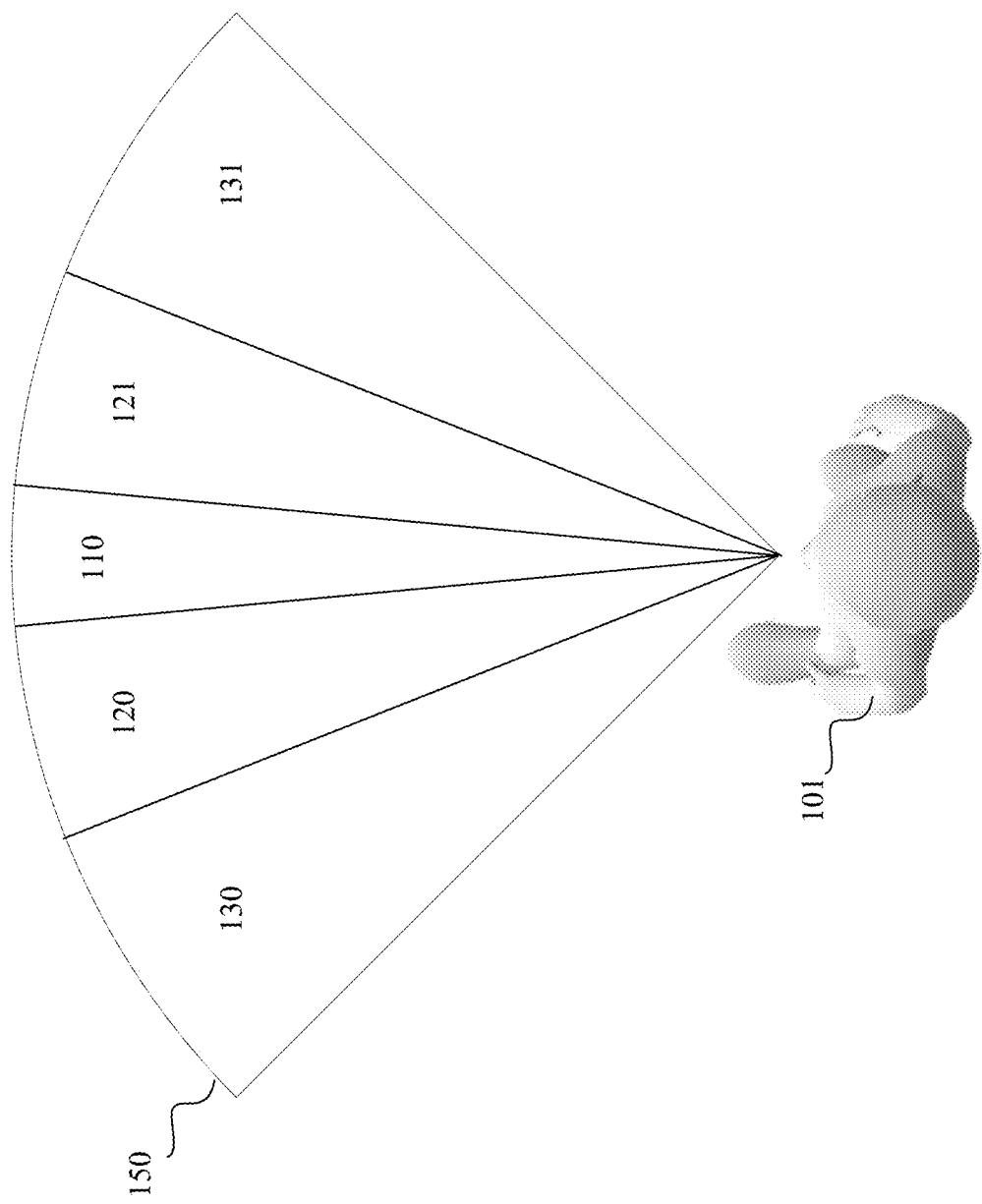
FIG. 1 provides a simplified diagram showing the discrepancy of a person's visual acuity over his field of view.

Embodiments described herein relate to a machine-learning approach for generating and/or compressing and reconstructing perceptively-accurate images (e.g., including video frames) based on a sequence of video frames with incomplete pixel information (e.g., sparse sample datasets of pixel color for the frames). Since perceptively-accurate images can be generated from sparse sample datasets using machine learning, the computationally more expensive rendering pipeline (e.g., using ray tracing, ray casting, or other physics-based computer-graphics techniques) may only be needed for a sparse subset of the total pixels in the image. As such, the embodiments described herein significantly reduce the overall computational cost, time, and system resources needed to generate images. In addition, since complete images can be reconstructed from their sample datasets using the embodiments descried herein, applications that need to transmit image data may transmit the corresponding sample datasets rather than complete pixel information, thereby significantly reducing transmission costs.

In particular embodiments, a machine-learning model may be trained to reconstruct a dense frame from (1) a sparse frame with incomplete pixel information and (2) a corresponding dense frame generated by transforming a previous frame, which may be reconstructed by the machine-learning model, using optical flow data. More specifically, the model may be tasked with reconstructing a dense frame from a given sparse frame associated with a particular time t. In addition to the information encoded in the time-t sparse frame, the model may be provided with an estimated time-t dense frame, which encodes spatial and temporal pixel information, to help the model determine the missing pixel information of the sparse frame. In particular embodiments, the estimated time-t dense frame may be generated from a time-t−1 frame reconstructed by the machine-learning model in the previous iteration. Using corresponding optical flow data that specify the pixels' spatial relationships between time t−1 and time t, the system may transform the time-t−1 frame to estimate how the dense time-t frame might look like. The estimated dense time-t frame, along with the sparse time-t frame, may be processed by the machine-learning model to reconstruct a dense time-t frame.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Despite tremendous advances in consumer hardware for real-time rendering and video compression, the demand for high-fidelity visuals continues to grow. Recent advances in head-mounted displays allow us to achieve a new level of immersion by delivering the imagery straight to the eyes. However, such displays also require a significantly higher resolution and refresh rate to provide high quality immersion and good visual experience across the entire field of view. Rendering this high-quality content is challenging even on current high-end desktop systems.

Rendering and/or transmitting high-resolution and high-frame-rate videos is a costly process. To ameliorate that cost, embodiments described herein enable applications to render/transmit only a small subset of the pixels in a video according to the visual acuity of humans and generate/reconstruct the complete video using neural networks. Particular embodiments take advantage of the visual acuity of humans. FIG. 1 provides a simplified diagram showing the discrepancy of a person's 101 visual acuity over his field of view 150. In this diagram, the center region 110 represents the person's 101 fovea view. The visual acuity of the person 101 decays farther away from the fovea view 110. For example, the person's 101 visual acuity in the neighboring regions 120 and 121 is less than that of the fovea view 110, and the visual acuity in regions 130 and 131 is worse still.

Observing that the acuity of the human visual system rapidly decays towards his/her peripheral vision, embodiments described herein are designed to render/transmit high pixel densities in the fovea view, while progressively and dramatically subsampling (referred to as "corruption") the spatio-temporal pixel volume in regions extending into the periphery. In doing so, the techniques described herein may significantly improve the time needed for generating and/or transmitting video frames. For example, in particular embodiments, rather than using traditional graphics pipelines to render every pixel of every frame, embodiments described herein allows rendering systems to generate a portion of the pixels using the more expensive rendering process (with higher concentration in the foveal region) and generate the rest using a machine-learning model (with higher concentration outside of the foveal region) that is computationally less expensive. In other embodiments, when transmitting videos, a transmitter may sample a portion of the original video frames based on the viewer's foveal region (e.g., pixels closer to the foveal region are more densely sampled than pixels farther away from the foveal region) and transmit only those samples to avoid having to transmit every pixel of the video. On the recipient device, the sparse pixel information received from the transmitter may be used to reconstruct the full video frame using a machine-learning model.

Figure 2A:
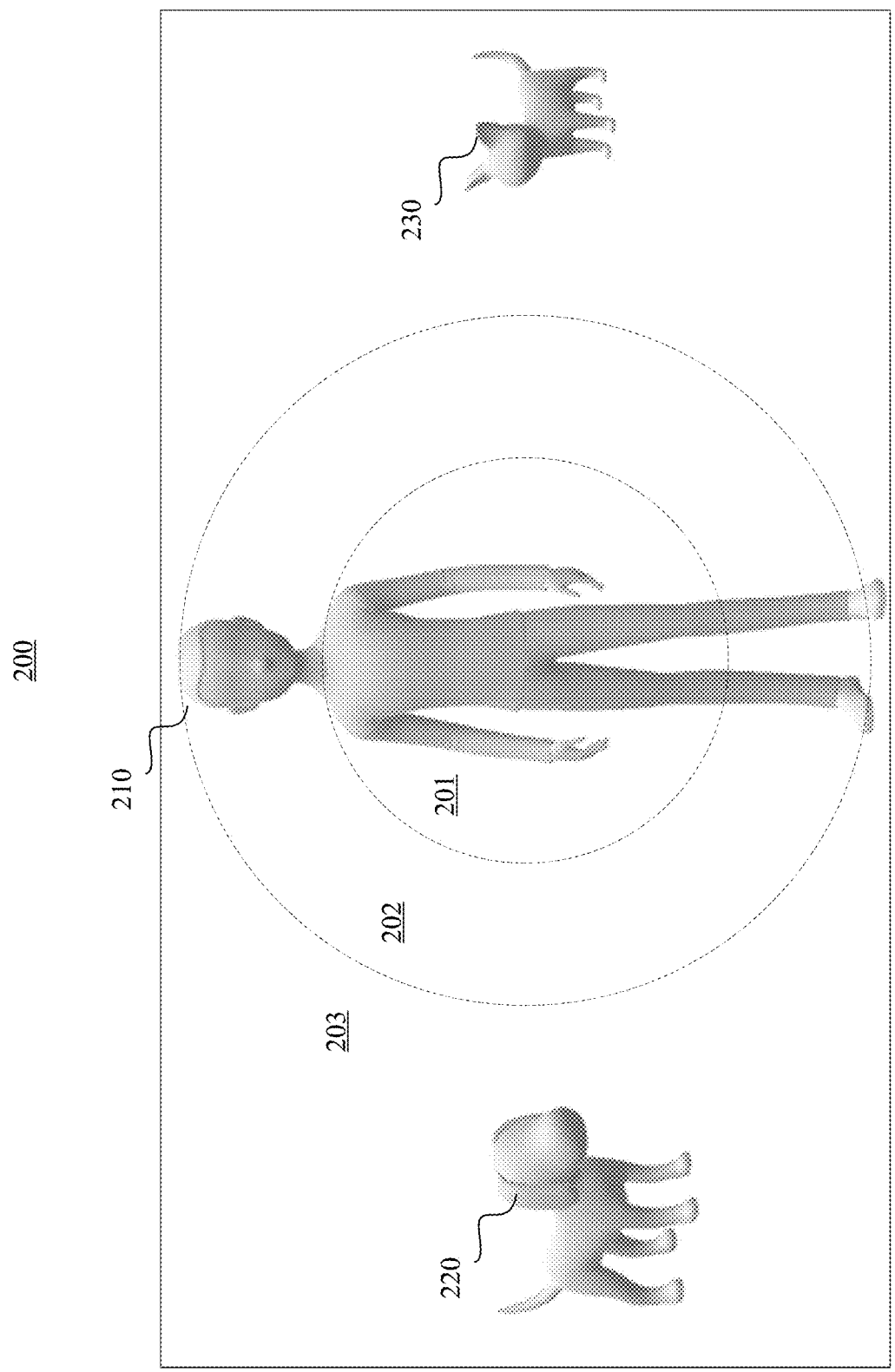
FIG. 2A illustrates the concept of foveated compression.
Figure 2B:
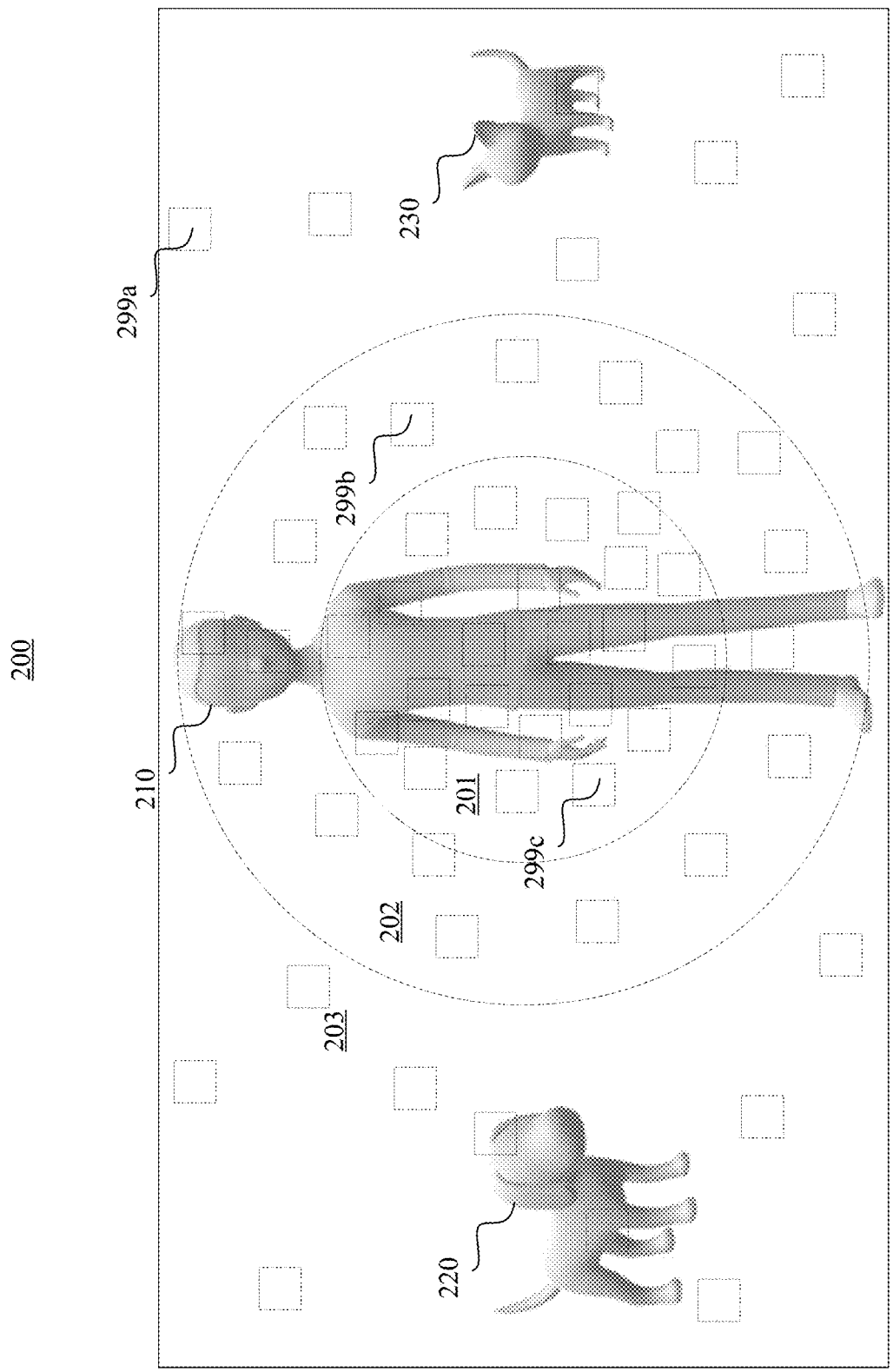
FIG. 2B illustrates an example of image sampling within a scene that takes advantage of a viewer's foveated vision, in accordance with particular embodiments.

FIGS. 2A and 2B illustrate the concept of foveated rendering and/or compression. FIG. 2A illustrates a scene 200 that is captured from or to be rendered for a particular viewpoint. The scene 200 contains a person 210 in the center of the viewpoint, a dog 220 to the left of the viewpoint, and a cat 230 to the right of the viewpoint. The dotted concentric circles are used to visually delineate the viewer's visual acuity. The region 201 within the smallest circle represents the foveal view of the viewer; the region 202 between the two circles represents a portion of the viewer's view that is farther from the foveal view; and the region 203 outside of the larger circle represents a portion of the viewer's view that is even farther from the foveal view.

FIG. 2B illustrates an example of image subsampling within the scene 200 that takes advantage of the viewer's foveated vision. In FIG. 2B, subsample locations are visually represented by the dotted squares (e.g., 299a, 299b, and 299c). As used herein, the term "subsampling" refers to the process of determining the color information for particular pixels (or sampling locations), which may be done by, for example, extracting pixel information from an existing image/frame (e.g., a pre-recorded movie or video clip) or rendering pixels of interest based on a 3D model via computer-graphics rendering. In particular embodiments, the density of the subsamples may directly correlate with the visual acuity of the viewer. For example, since the viewer's foveal view is centered at region 201, subsampling may be highly dense within that region 201. For regions that are farther away from the center of the foveal view of the viewer, progressively fewer or less dense subsamples may be obtained. For example, in FIG. 2B, the subsamples within region 202 are less dense than those within region 201 but denser than those within region 203. Since the visual acuity of the viewer is low in the periphery, having less subsample density in such regions would have minimal effect on the viewer's viewing experience. As will be described in further detail below, for areas where no subsamples are obtained, a machine-learning model may be used to approximate their color information. Since the viewer would not be able to see clearly in the periphery due to biological or lensing limitations anyway, having lower quality or less accurate color information in the corresponding image would not significantly impact, if at all, the viewer's viewing experience. This allows a graphics rendering system, for example, to selectively render pixels based on the viewpoint of the viewer (e.g., the foveal view may be assumed to be in the center or detected by an eye-tracking device) and avoid having to render a complete image or frame, thereby saving significant computational resources and time. Similarly, a video transmission application (e.g., such as a video-streaming service or a video-sharing application on a mobile device) may selectively transmit a portion of the pixels based on the viewpoint of the viewer and have the rest of the pixels reconstructed on the recipient device to avoid transmitting every pixel in the video sequence.

As mentioned above, the missing or unsampled portions of an image, such as a frame in a sequence of video frames, may be reconstructed using a machine-learning model. The machine-learning model may reconstruct the missing information based on the subsamples available for the current frame (the collection of subsample of pixel information for an image may be referred to as a sample dataset of that frame). In addition, particular embodiments of the machine-learning model may also be provided with spatio-temporal information of the scene from previous frames generated by the machine-learning model. Spatio-temporal information from previous frames is a good source of information for reconstructing the current frame because video sequences exhibit high redundancy in space and particularly over time.

Figure 3A:
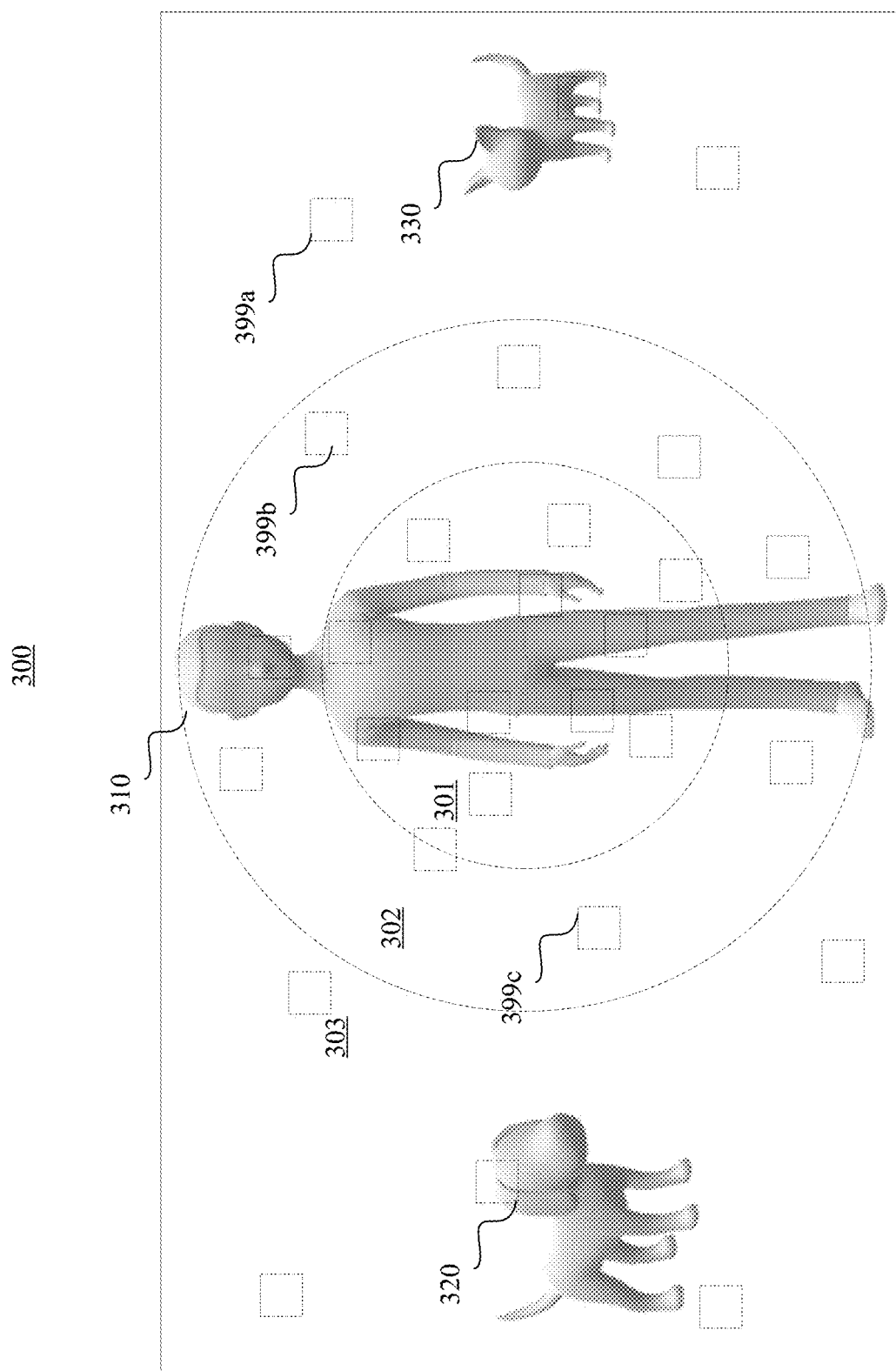
FIGS. 3A-B illustrate an example where image sampling per video frame may be further reduced due to the availability of spatial data across a sequence of frames, in accordance with particular embodiments.
Figure 3B:
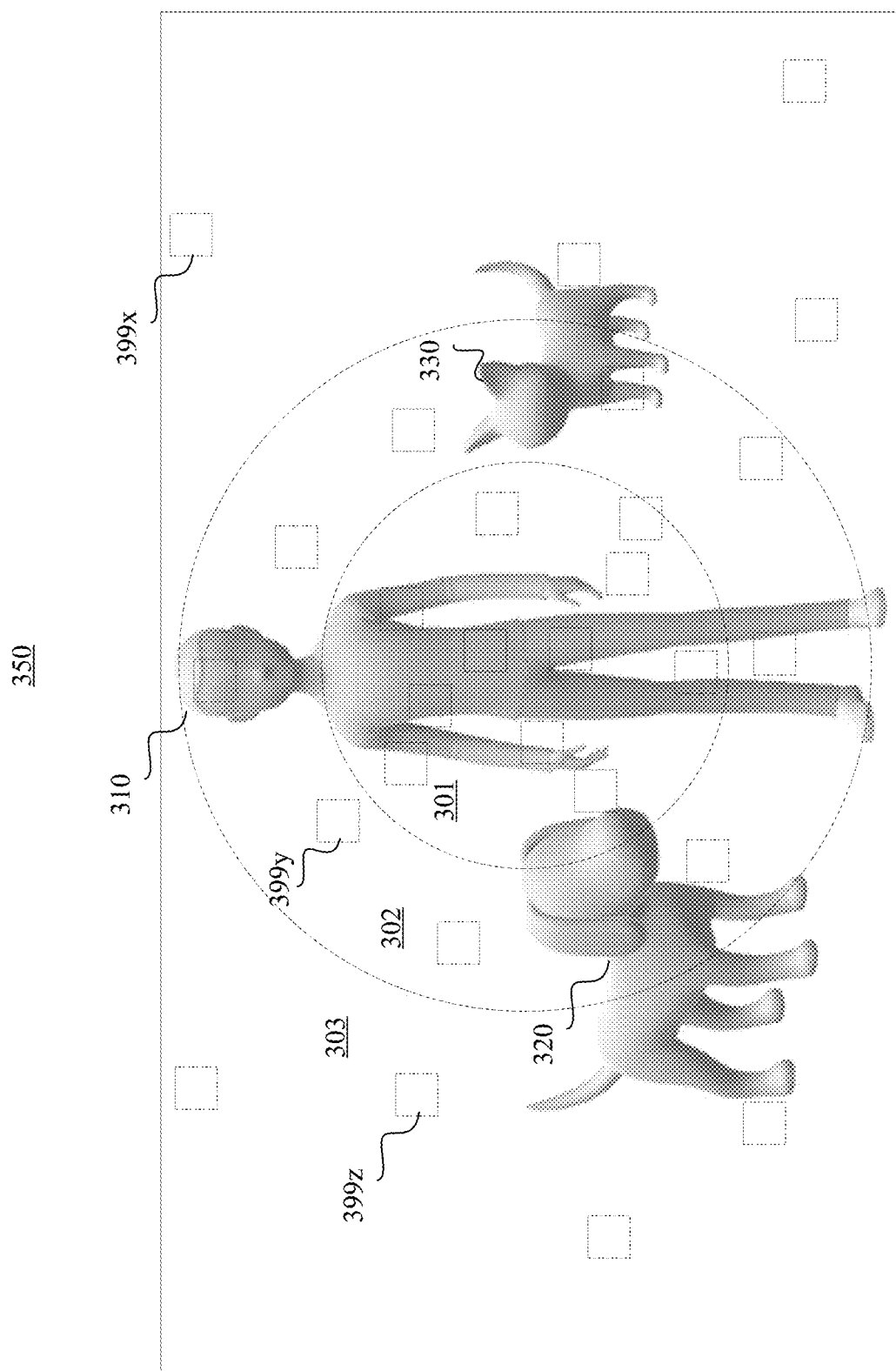

FIGS. 3A-B illustrate an example where image sampling per video frame may be further reduced due to the availability of spatial and temporal data across a sequence of frames, in accordance with particular embodiments. FIG. 3A illustrates a scene 300 that contains a person 310, a dog 320 on the left, and a cat 330 on the right, similar to the one 200 shown in FIGS. 2A-B. In a similar manner, region 301 within the smallest circle represents the foveal view of the viewer; the region 302 between the two concentric circles represents a portion of the viewer's view that is farther from the foveal view; and the region 303 outside of the larger circle represents a portion of the viewer's view that is even farther from the foveal view. Subsample locations (e.g., 399a, 399b, and 399c) are visually represented by the dotted squares. In FIG. 3A, the subsamples are the densest within region 301, less dense in region 302, and the least dense in region 303.

FIG. 3B illustrates another scene 350 in a sequence of scenes that comprises the one 300 shown in FIG. 3A. As an example, the scene 300 shown in FIG. 3A may temporally precede the scene 350 FIG. 3B. Compared to scene 300 in FIG. 3A, the dog 320 and cat 330 in scene 350 have moved closer to the person 310 and forward towards the viewpoint. Despite these changes, the two scenes 300 and 350 contains redundant information. For example, the person 310 in both scenes 310 and 350 remained in place and may appear identical. Although the dog 320 and cat 330 moved between scenes, their appearance information is still captured in both scenes. As such, a machine-learning model in accordance with particular embodiments may be trained to use sample datasets from both scenes 300 and 350 to reconstruct any missing pixel information for a particular frame. Since the machine-learning model could obtain information from the sample datasets associated with multiple scenes, the sample dataset for each of the scene may be sparser than what would otherwise be needed. For example, compared to FIG. 2B, the subsample in FIGS. 3A and 3B are less dense. In particular embodiments, to improve coverage of different areas or objects within the scene, the subsample locations may vary from scene to scene. For example, the subsample locations for scene 350 (e.g., 399x, 399y, 399z) are different from the subsample locations for scene 300. While the example shown in FIGS. 3A-B shows objects in the scene changing positions, the same principle described above would apply equally to scene changes that are due to changes in the viewer's viewpoint (e.g., the viewer may be moving) or a combination of changes in the viewer's viewpoint and changes in object positions.

Embodiments described herein relates to a peripheral reconstruction method to assist with foveated rendering. Given a sparse stream of color pixel values as an input, the peripheral reconstruction problem may be formulated as a projection-to-manifold problem, where the goal is to find the closest natural video that corresponds to the sparse foveated input on the manifold of natural videos. Particular embodiments use an adversarial training of generative video networks to train a reconstruction network to infer peripheral details based on the learned manifold of natural videos. This manifold also allows the model to infer the spatio-temporal semantic context based on one or more previous frames warped based on optical flow data. This allows us to achieve a significant reduction in the amount of required content without degrading the perceived quality in the peripheral vision.

As previously mentioned, delivering high quality content to each location in a head-mounted display (HMD) is computationally expensive. To save computation, peripheral compression becomes increasingly important for both rendered and captured video content. However, foveated rendering can produce visual artifacts. Simply down-sampling with eccentricity introduces aliasing and jitter. These phenomena encumber the design of an efficient and visually lossless foveated rendering.

When designing a reconstruction model, the spatiotemporal sensitivity of the eye must be carefully considered. Under-sampling spatial details every frame without applying an appropriate pre-filter leads to aliasing-induced flicker as objects traverse points in the visual field. Neglecting spatiotemporal frequencies introduces another source of flicker as well as "tunnel vision" phenomena. Designing a model that respects these sensitivities and avoids flicker across the entire visual field is challenging.

In contrast to most foveated rendering methods, the foveated reconstruction method described herein does not require any knowledge about how the image was generated, such as rendering-specific attributes, or a decomposition into visibility and shading. Instead, the method described herein is inspired by the compression and inference in human visual system that is crafted to rely on natural video statistics. This allows us to design a single method for both synthetic content as well as regular videos and images. To avoid perceptual artifacts in the periphery, the embodiments described herein rely on in-hallucinating the video content based on the learned statistics of natural videos to achieve high quality foveated compression.

Figure 4:
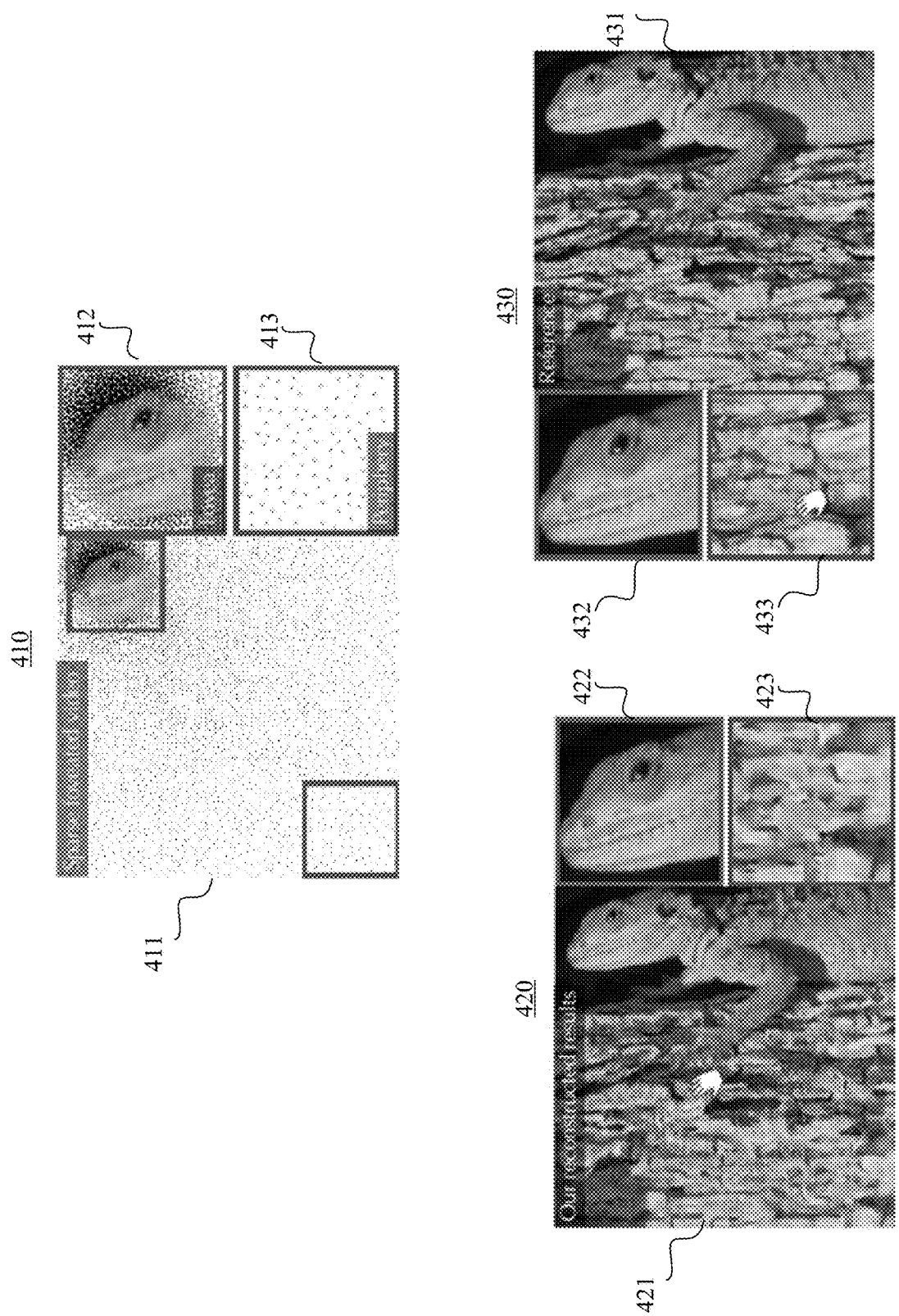
FIG. 4 illustrates an example of a reconstructed dense frame generated from a sparse frame.

FIG. 4 illustrates an example of a reconstructed dense frame generated from a sparse frame. The collection of images 410 includes a sparse frame 411 that includes incomplete pixel information, a zoomed-in view of a dense region 412, and a zoomed-in view of a sparse region 413. The dots in sparse frame 411 represent known pixel information, which may be generated by performing graphics rendering (e.g., by performing visibility tests and color filtering operations) or sampling an existing dense image. The sparse frame 411 may be the result of foveated rendering for a user whose gaze is directed towards the upper-right corner of the frame 411. As such, the upper-right corner of the sparse frame 411, which corresponds to the user's foveal region, has relatively denser pixel information than elsewhere in the frame 411. For example, the lower-left corner of the frame 411, which is the farthest from the user's foveal region, has a lot fewer known pixels. The pixel-density contrast between the two regions is more clearly shown by the zoomed-in views 412 and 413.

The objective of particular embodiments is to process the sparse frame and generate a reconstructed dense frame. The collection of images 420 provides an example of a dense frame 421 generated from the sparse frame 411. Even though the sparse frame 411 had many missing pixels, the reconstructed dense frame 421 has complete pixel information. For example, the zoomed-in views 422 and 423 of portions of the reconstructed dense frame 421 includes pixels that were missing from the corresponding zoomed-in views 412 and 413 of the sparse frame 411. The reconstructed frame, however, may not be perfect. For example, when the collection of images 420 is compared to a collection of reference images 430 with full resolution, it can be seen that there are differences. However, it should be noted that the portion of the reconstructed frame 421 corresponding to the user's foveal region is very similar to the reference image 431 (e.g., the zoomed-in views 422 and 432 are very similar). This is desired since the user's visual acuity is high in foveal region. The difference between the reconstructed frame 421 and the reference frame 431 is greater outside of the user's foveal region (e.g., the difference between the zoomed-in views 423 and 433 is more pronounced). This difference, however, may not be perceptible to the user since the user's visual acuity is lower in areas that are farther away from the user's foveal region.

Embodiments for reconstructing dense frames from sparse frame will now be described. In rendering systems, each pixel requires a high amount of computation. To reduce this workload, a small subset of the total number of required pixels each frame is rendered using a graphics pipeline and rest is inferred with a trained reconstruction machine-learning model. Video captured from both the real world and realistic renders follow strong statistical regularities known as natural scene statistics. The human visual system is also adapted to comprehend real-world imagery that naturally possesses these statistics. This provides a great opportunity for compression by relying on the statistics that form the manifold of all natural videos.

To reduce the number of bits required to encode a signal, embodiments described herein subsample each frame using a sparse randomized mask. By reducing the number of samples in the mask, the compression rate directly increases. By shaping this mask according to the cell density layout of the retina, bits could be perceptually allocated.

In particular embodiments, for each pixel position x of a source video frame, a computing system may first compute the sampling rate $R(x) \in [0; 1]$ based on the maximum perceptible frequency, the geometric setup of the display, and the desired compression rate. For each video frame, a foveated sampling procedure fills an N×M binary mask, M, according to $M(x) = \mathbb{1}_{R(x)>u}$, where u is a random variable bounded [0, 1], which can follow some uniform random distribution. To better follow the distribution of retinal cones, a low-discrepancy blue noise sequence may be employed. Valid pixels for a frame are then selected based on this mask, and the mask itself is provided as an input to reconstruction. The mask may be sampled independently at every frame, so the network can accumulate more context over time.

The reconstruction methodology may be formulated as follows. Let $X = \{x_1, x_2, \ldots, x_K\}$ be a sequence of K video frames, where $X \in \mathbb{R}^{N \times M \times K}$. Let $M = \{m_1, m_2, \ldots, m_K\}$ be a sequence of binary masks described previously. We produce a sampled video $\hat{X} = \{\hat{x}_1, \hat{x}_2, \ldots \hat{x}_K\}$ by applying each mask to a corresponding source video frame as $\hat{X} = X \odot M$. The goal of the network G we train is to learn to approximate the mapping $\hat{X} \to X$ by leveraging the large prior of the natural video manifold.

Figure 5:
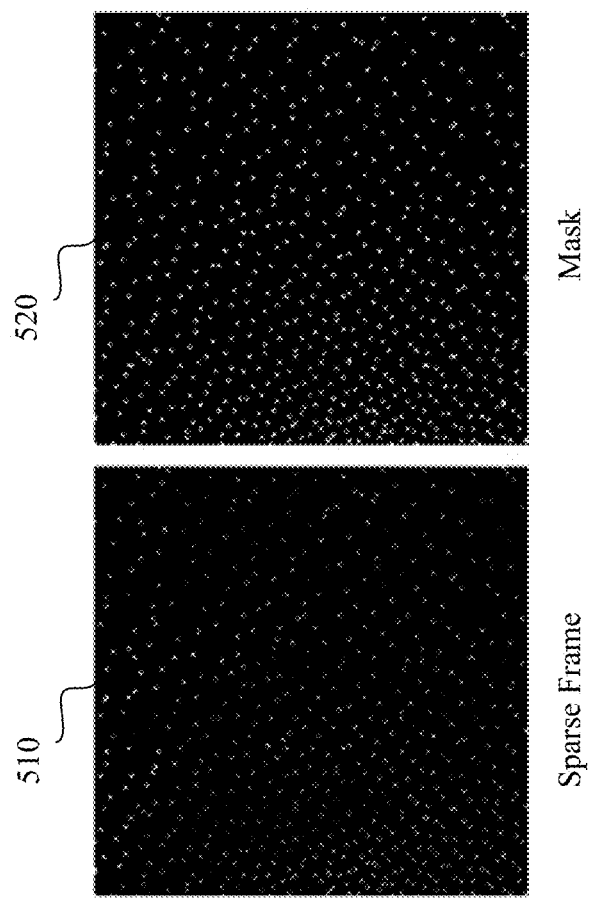
FIG. 5 illustrates an example sampling dataset that includes RGB pixel samples and a binary mask indicating their locations.

FIG. 5 illustrates an example of an RGB sparse frame 510 and a corresponding binary mask 520 indicating locations for performing subsampling. The sparse RGB pixel samples 510 may be generated by sampling an existing dense RGB frame or rendering the particular pixel samples via any suitable computer-graphics rendering pipeline. The subsample locations may depend on the viewing direction of the viewer and/or the configuration of the optics used for viewing the image (e.g., the optics used in a virtual-reality or augmented-reality headset). Regions that are closer to the viewer's foveal view or gaze direction may be more densely sampled, whereas regions farther away may be less densely (or more sparsely) sampled. In particular embodiments, based on the desired subsample density for each region, the system may randomly determine the subsample locations and determine the corresponding colors. In particular embodiments, the subsample locations may be stored using a binary mask 520. The binary mask 520 may have pixel locations that correspond to the RGB pixel samples 510. Each pixel in the binary mask 520 may indicate whether that pixel is sampled or unsampled (e.g., 0 may indicate an unsampled pixel and 1 may indicate a sampled pixel, or vice versa). Since a sampled pixel may have the same color value as that of an unsampled region, the binary mask may be used to disambiguate such scenarios (e.g., a sampled color of black may have an associated value of 0, which would conflate with the default 0 value of an unsampled region). In particular embodiments, the sampled RGB colors and the binary mask may be stored in four channels of an image (e.g., the RGB color information may be stored in the RGB channels of the image, and the binary mask information may be stored in the alpha channel of the image).

The mask 520 may be used during the training phase and the inference phase of the machine-learning model. During training, the mask 520 may be applied to an RGB frame to generate a training sample used for training the machine-learning model. At the inference stage, the mask 520 may be used to determine which pixels should be rendered using a standard graphics rendering pipeline. The mask may also be used to determine which pixels should be selected to be used later for reconstructing a dense frame (e.g., the selected sparse pixels could be transmitted to a receiving device, where the dense frame may be reconstructed).

The presently-described approach to the problem of sparse reconstruction is based on machine learning. There are several goals for the presently-described embodiments. First, the network should be able to operate in an online mode, i.e., it should be able to reconstruct the current frame based only on the past frames. Second, the network should be able to operate in real time, even gaze-contingent display systems. Due to these requirements, it is not ideal to have complicated models or use significant number of past or future frames.

There are also requirements for output quality. The human visual system is not sensitive to high-frequency details in the periphery, however, motion and flicker are easily detectable. Therefore, while the peripheral reconstruction can omit fine details, it should not introduce significant noise to achieve plausible results with high compression. Given the uncertainty of the sparse video input, the network needs to balance between introducing the new content timely and suppressing flicker due to the inbound noise.

If the method is used for gaze contingent reconstruction, it has to exhibit under 50 ms of latency for each frame in order to be unnoticeable for human vision. Moreover, for head-mounted displays (HMD), the method has to run at HMD's native refresh rate and high resolution to avoid motion sickness and provide a comfortable experience. For many existing VR HMDs the minimum refresh rate is 90 Hz.

In addition, power consumption is highly important for mobile devices, such as HMDs. The embodiments described herein should significantly save computation and power compared to the naïve solution of rendering/transmitting the full video content. Rendering full video content means that each pixel of each video frame needs to be rendered (e.g., via ray tracing visibility tests, shading, etc.) and transmitting full video content means that every pixel information (whether or not it is encoded or compressed) is transmitted. Both of these operations could be resource-intensive in terms of processing power and time, memory, storage, transmission bandwidth, etc. The reconstruction algorithm described herein provides significant savings in these areas by reducing the number of pixels that need to be rendered/transmitted and using a machine-learning model to reconstruct the rest. In particular embodiments, the reconstruction system may be communicatively coupled to an eye-tracking system and therefore could dynamically determine the current eye position of the viewer to determine which areas to sample more and which areas to sample less.

In particular embodiments, the machine-learning model may be a recurrent neural network that is trained to perform the reconstruction task. In particular embodiments, the network may be a generative adversarial network (GAN). Deep learning algorithms continually show results of unprecedented quality in the realm of image synthesis and analysis. Due to their fixed-function pipeline, they are highly amenable to execution on hardware. Therefore, they are a natural choice for the problem at hand.

Embodiments described herein may utilize any suitable machine-learning techniques. For example, particular embodiments may be based on a framework of Generative adversarial networks (GAN). GAN is suitable for learning complex distributions, such as a manifold of natural images or videos, by combining a generator with a trainable adversarial loss, implemented using another network called a discriminator. This trainable loss has enough capacity to learn extremely high-dimensional distributions of data, such as the distribution of natural images or videos. The discriminator plays a minimax game with the generator network by learning to distinguish between the samples from the generator's distribution and real data samples.

In particular embodiments, GAN may be used to train the reconstruction model. The reconstruction network G may be implemented using the U-Net encoder-decoder design with skip connections. It transforms an image into a hierarchy and skip connections allow to bypass high frequencies and improve the gradient flow during training. Each decoder block does the reverse of an encoder block, performs a spatial bilinear upsampling, while decreasing the feature count correspondingly to the symmetric encoder block. The input to a decoder block is the upscaled output of the previous decoder block concatenated with the output of the corresponding encoder block (via skip connections). ELU activation function may be used in all networks and layers (including any recurrent and discriminator layers) to accelerate the training.

Figure 6:
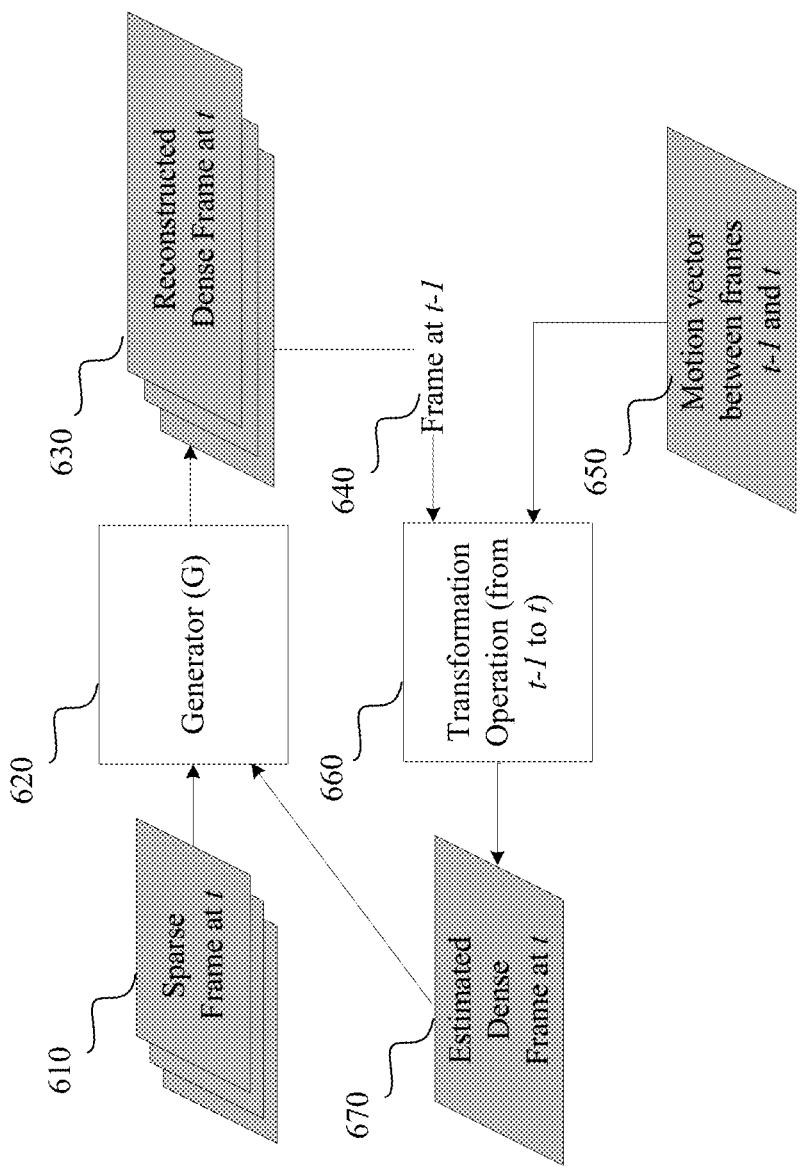
FIG. 6 illustrates an example framework for reconstructing dense frames from sparse frames, in accordance with particular embodiments.

FIG. 6 illustrates an example framework for reconstructing dense frames from sparse frames, in accordance with particular embodiments. The framework utilizes a machine-learning model, referred to as the generator (G) 620, that is trained to reconstruct dense frames 630 from sparse frames 610 (the generator 620 and how it is trained will be described in further detail below). The sparse frames 610 may be a sequence of frames in a video. As previously described, each sparse frame 610 may have incomplete pixel information (e.g., a sparse frame may be generated based on a mask, as shown in FIG. 5). Depending on the application for which the framework is utilized, the sparse frames 610 may be generated by a graphics rendering engine. For example, when a virtual reality scene needs to be rendered, the rendering system could determine the density distribution of the pixels for the sparse frame. The density distribution could be based on the user's gaze (e.g., as determined based on eye-tracking techniques) and/or known characteristics of the optical system. For example, pixel density may be higher in regions of the frame that are closer to where the user is looking or the location of the center of the screen. Conversely, pixel density may be lower in regions of the frame that are farther away from where the user is looking or the location of the center of the screen. The rendering system may then only render the desired pixels to generate the sparse frame and not expend computational resources on the rest of the frame. For example, for each pixel of interest, the rendering system may cast a ray through that pixel of interest and into a 3D model of a virtual environment to determine what is visible to that pixel. Based on the result of the visibility test, the rendering system would know the point of intersection between the ray and a virtual object. The rendering system may then perform color filtering by sampling a texture image associated with the virtual object to determine the color for the pixel.

The sparse frames 610 may also be generated by applying the aforementioned masks (e.g., the mask 520 shown in FIG. 5) to full-resolution frames. For example, for each frame in a sequence of frames, an appropriate mask with the desired pixel density distribution may be applied to the frame to generate a corresponding sparse frame 610. This may be useful in situations where the sparse frames 610 need to be transmitted to another device, since the sparse frames 610 contain less pixel information and therefore require less bandwidth to transmit. The receiving device may then use the generator 620 to reconstruct dense frames 630 from the sparse frames 610. Sparse frames 610 may also be generated in this manner to create training samples for training the generator 620, since the high-resolution frames from which the sparse frames 610 are generated may be used at the ground-truth.

In particular embodiments, when generating reconstructed dense frames 630 from sparse frames 610, the generator 620 may be trained to leverage the spatiotemporal information provided in previously-generated reconstructed dense frames. For example, the generator 620 tasked with reconstructing a dense frame associated with time t (the reconstructed dense frame may be referred to as $RD_t$) may take two inputs. One input may be a corresponding sparse frame 610 associated with time t (the sparse frame may be referred to as $S_t$). The other input may be an estimated dense frame 670 associated with time t (the estimated dense frame may be referred to as $ED_t$). The estimated dense frame 670 may be generated based on one or more previously reconstructed dense frames 630. In particular embodiments, the estimated dense frame 670 may be generated by performing a transformation or warping operation 660 on a previously-reconstructed dense frame 640 according to a corresponding motion vector 650. For example, a computing system may use the reconstructed dense frame 640 associated with time t−1 (referred to as $RD_{t-1}$) to generate $ED_t$ 670. $ED_t$ 670 provides the generator 620 with spatiotemporal information that natural videos typically have (e.g., since there is typically a high correlation between sequential frames in a video) to help the generator 620 reconstruct the missing pixel information needed for $RD_t$. In the embodiment just described, the generator 620 is trained to take as input $S_t$ and $ED_t$ (derived from $RD_{t-1}$) to generate $RD_t$. In that embodiment, the spatiotemporal relationship encoded by the motion vector 650 is explicitly used by the transformation operation 660 to help simplify the task for the generator 620. In other embodiments, the generator 620 may instead be trained to take as input $S_t$ 610, $RD_{t-1}$ 640, and the motion vector 650 to generate $RD_t$.

To estimate what the reconstructed dense frame 640 at time t−1 would look like at time t, the system may transform $RD_{t-1}$ based on a motion vector 650 (or optical flow) that specifies the spatial relationship or correspondence between the pixels in the frame at time t−1 and pixels in the frame at time t. For example, if a dog changes location relative to the camera from time t−1 to time t, the motion vector may specify that a particular pixel location showing a part of the dog in the frame at time t corresponds to another pixel location showing that same part of the dog in the frame at time t−1. Thus, during the transformation operation 660, the computing system may use the motion vector 650 to determine where each pixel in $RD_{t-1}$ is estimated to appear in $ED_t$ at time t. For example, if the motion vector indicates that a pixel at (x,y) in $ED_t$ corresponds to a pixel at (x−2, y) in $RD_{t-1}$, the color information at (x,y) in $ED_t$ may be determined based on the color information of at (x−2, y) in $RD_{t-1}$.

The motion vector 650 may be generated in a variety of ways. In particular embodiments, the motion vector may be generated by a rendering engine. However, rather than performing a full render pipeline that includes both visibility tests and color filtering, the rendering engine may perform visibility tests without color filtering to generate the motion vector 650. Color filtering is not needed because the motion vector only needs to specify the spatial correspondence between the pixels of two frames. Such correspondence information may be obtained using visibility tests (e.g., the same object feature appears at pixel location (x,y) in one frame and pixel location (i,j) in the next frame) without require any color information. Since color filtering is by-far the most computationally expensive operation in the rendering pipeline, not having to perform color filtering provides significant computational savings.

In particular embodiments, the motion vector 650 may be reconstructed from a sparse motion vector using machine learning. The sparse motion vector may be generated using the visibility tests of the rendering pipeline as described above, but only for sparse pixels. Alternatively, the sparse motion vector may be generated by applying a mask (similar to the one described with reference to FIG. 5) to a dense motion vector. The sparse motion vector may be fed into a machine-learning model to reconstruct the dense motion vector 650. In particular embodiments, the same generator 620 trained to reconstruct dense frames 630 may also be trained to reconstruct motion vectors 650 from sparse motion vectors. In that case, the generator 620 may take a sparse motion vector as an additional input and output a corresponding reconstructed dense motion vector 650. In another embodiment, a separate machine-learning model, which could also be a generator trained using GAN, may be trained to reconstruct dense motion vectors 650 from sparse ones. When training the machine-learning model for reconstructing motion vectors (whether the generator 620 or a separate one), the model may be trained based on adversarial loss and/or L2 loss.

In particular embodiments, the generator 620 may be trained using GAN. GAN may include the generator (G) 620 and a discriminator (D). At a high-level, the generator 620 may be configured to generate or reconstruct a "fake" image that has portions in-painted for missing pixel information. The discriminator, on the other hand, may be configured to assess whether a given image is "fake" (or generated by the generator 620) or "real" (or not generated by the generator 620). During training, the high-level goal is to improve the generator's 620 ability to generate "fake" images that can fool the discriminator and concurrently improve the discriminator's ability to detect "fake" images generated by the generator 620. The goal at the end of training is for the generator 620 to generate realistic "fake" images. Thus, once training is complete, the generator 620 (and not the discriminator) could be put into operation during inference time and generate or reconstruct video frames.

In particular embodiments of the training process, the training samples used for training the GAN network may be a sequence of frames, each having complete pixel information. The sequence of frames may be a temporal sequence of views of a scene as captured by a video camera or rendered using computer graphics. In particular embodiments, the sequence of frames may be processed by a corruption module. The corruption module may sample each frame and output a corresponding sample dataset. Each sample dataset for a frame may contain sparse, incomplete pixel information, with regional densities dependent on the viewer's gaze direction (or foveal region).

In particular embodiments, the sample datasets may be used to train a GAN network. The sparse frames of the sample datasets may be input into a generator 620. The generator 620 may comprise neural networks whose parameters may be updated/trained during the training process. The generator 620 may output a sequence of reconstructed dense frames 630 that correspond to the original sequence of frames as well as the associated sample datasets of those frames. As previously mentioned, each sample dataset includes sparse, incomplete pixel information. The corresponding generated dense frame 630 may have the missing pixel information filled in by the generator 620. Each of the generated frame 630 may also be considered as a "fake" image.

In particular embodiments, the generated frames 630 are tested by the discriminator and the results are used to train or update the neural networks of both the generator 620 and the discriminator. How the networks are updated depends on one or more loss functions that quantifies the performance of the networks. To illustrate with a simple example, if the generated frame 630 is very similar to the corresponding original frame, then the content loss may be small (a desirable result). On the other hand, if the generated frame 630 is dissimilar to the corresponding original frame 610, the content loss may be large (an undesirable result). With GAN, one of the loss functions used may be termed adversarial loss. In particular embodiments, the sequence of reconstructed dense frames 630 may be input into the discriminator, which would determine a likelihood of the input frames being "fake" (or generated by the generator 620). If the reconstructed frames 630 look real, the discriminator may be "fooled" into a determination that the reconstructed frames 630 are "real" (or not generated by the generator 620). Similarly, the original frames (or the ground truth) may also be input into the discriminator so that it can determine whether the original frames are "real" or "fake." The output of the discriminator may be used to determine the adversarial loss of the GAN network. The adversarial loss and/or any other suitable loss functions may be iteratively used to update the generator 620 and discriminator so that each gets better performing their respective tasks (in other words, the parameters of the two networks are updated to reduce the loss in subsequent iterations). Once training completes (e.g., when the loss function is below a certain threshold or a sufficiently large set of training samples has been used to train the GAN network), the generator 620 may be used at inference time to reconstruct the missing pixel information of sparse frames.

More specifically, in particular embodiments, the generator network G 620 may be optimized during training with respect to a weighted sum of several losses, namely, adversarial loss ($L_{adv}$), perceptual spatial loss ($L_{LPIPS}$), and optical flow loss ($L_{flow}$) for temporal dynamics:

$$L_G = W_{adv} \cdot L_{adv} + W_{LPIPS} \cdot L_{LPIPS} + W_{flow} \cdot L_{flow}$$

Adversarial loss ($L_{adv}$). The adversarial loss may be modeled by a discriminator network. The discriminator allows to learn the spatiotemporal manifold of natural videos by providing a boundary between a distribution of interest and the rest of possible videos. The discriminator—in contrast to the generator—processes the entire video sequence at once and can therefore reason about space-time relations and analyze the spatiotemporal dynamics. The goal of the discriminator is to classify videos into fake (constructed by the generator) and real (sampled from the dataset).

In particular embodiments, the discriminator may be modeled based on a Wasserstein GAN (WGAN) design, which stabilizes the training due to its robust loss function. A 3D convolutional network $D_1$ may be used as a Wasserstein measure with recent Spectral Normalization GAN (SN-GAN) to ensure 1-Lipschitz continuity. SN-GAN enables fast training on videos, while providing more stable adversarial training.

In particular embodiments, the network $D_1$ has a 3D funnel structure and consists of residual blocks with decreasing spatial size. The network operates on the whole video as an input. In particular embodiments, 3D convolutional layers with 3×3×3 spatiotemporal kernels may be employed in order to enable full analysis of spatiotemporal features. Each block contains two 3D convolutions, followed by a 3D average pooling operation that averages both spatial dimensions and the temporal one. ELU may be used as activation functions to allow the discriminator to recover from sparsity, which reduces chances of training collapse. To focus the network on fine details, instead of reducing the video to a single scalar value, PatchGAN loss may be used and require the network to classify local patches of generated videos.

An inherent assumption of WGAN design is that the discriminator should be 1-Lipschitz continuous, i.e., $$\forall x_1, x_2 : |f(x_1) - f(x_2)| \leq |x_1 - x_2|$$

Standard networks generally violate this constraint. There are several approaches to ensure 1-Lipschitz continuity. For example, Spectral Normalization in the discriminator may be used to bound the matrix spectrum of each layer's weights. This approach allows for fast training, which is beneficial for training video networks, while leading to comparable results with other state-of-the-art methods.

It is well known that the natural images have a characteristic statistics of a vanishing Fourier spectrum. Natural videos also obey similar natural spectral statistics. To help the discriminator learn the intricate relations between spatial features and their natural motions, a second network may be introduced in the adversarial loss that learns the manifold of the spatiotemporal spectra of natural videos. For that, the training system may first Fourier-transform the whole input video into its 3D spectrum. Then another discriminator network with the same design as $D_1$ may be used to learn the spectral manifold of natural videos. Since there are no image patches anymore, we append two fully connected layers with 256 and 1 unit correspondingly, with one ELU activation in between. This helps to learn the structure of spatiotemporal frequencies that occur in natural videos. Particularly, this loss helps detecting unnatural noise and flicker.

Perceptual Spatial Loss ($L_{LPIPS}$). To promote similarity of each reconstructed frame to its source frame, some measure of similarity is needed. Per-pixel $L_1$ loss is too low-level and prescriptive. Instead, particular embodiments may use the calibrated perceptual loss ($L_{LPIPS}$). By minimizing $L_{LPIPS}$, the network learns to endow each reconstructed frame of the video with natural image statistics. This also bootstraps the adversarial training, while providing enough freedom to the reconstruction. A pretrained VGG-19 consists of five blocks, each of which corresponds to a different level of abstraction of the initial image. Particular embodiments may take outputs of the $conv_2$ layer from each block to use as feature extractors:

$$L_{LPIPS}(x_1, x_2) = \sum_{i=1}^{5} \|conv_{i,2}(x_1) - conv_{i,2}(x_2)\|_1$$

Unfortunately, this loss improves only spatial (intra-frame) features, while providing no temporal relation between frames. For peripheral video quality, it is more important to enforce temporal coherency. To make it cooperate with spatiotemporal losses and encourage the gradient flow through recurrent connections, particular embodiments may exponentially downweigh this loss for the first eight frames of the video. This loss corresponds well with human perception and gives enough freedom to the network.

Optical flow loss ($L_{flow}$). Particular embodiments may use optical flow loss to stimulate temporal consistency across frames and disentangle the spatiotemporal correlation of video frames. There are multiple ways to employ the optical flow in video generation. One is to estimate the optical flow directly in the generator and require the generator to match the target optical flow, as well as match the ground truth picture with the warped image. However, this adds complexity to the network and does not meet our inference performance constraints. As previously discussed, particular embodiments may match reconstructed frame with previous reconstructed frame, warped by the known motion vector. As such, the optical flow loss may be computed as: $L_{flow} = \|RD^t - ED_t\|$. This indirect approach encourages the network to retain consistent content and smooth movements over time, while not prescribing any particular spatial content.

After training completes, the generator 620 may be used in operation (or at inference time) to complete full video frames based on sparse pixel data. In particular embodiments, the generator 620 may be used to optimize foveated rendering for computer graphics applications and/or foveated compression for image transmission applications. With respect to foveated rendering, the generator 620 may be used to improve the speed at which computer graphics are generated. For example, a computer-graphics application (e.g., an AR/VR application, game, etc.) may render sparse pixel data using any suitable rendering technique (e.g., physics-based rendering algorithms, such as ray tracing). The density of rendered pixels may be higher in regions closer to the foveal area than regions farther away from the foveal area (e.g., the foveal area may be determined based on an eye-tracking device or pre-determined based on the device's lens parameters or by the application). Instead of rendering the rest of the pixels in the same manner, the application may use the trained generator 620 to fill-in the missing pixel information. Even though the pixels generated by the machine-learning model (or generator 620) may be less accurate than what could be generated by the traditional rendering algorithm, there would be little or no perceptive difference to the viewer due to the viewer's foveal viewing limitations.

With respect to foveated transmission, particular embodiments may be used by a transmitter to effectively transmit less image data than would otherwise be required, thereby reducing transmission time. For example, a transmitter may be instructed to transmit a video to a receiver. The video may be a pre-stored video (e.g., a video captured by a camera, computer-generated animation, etc.) and contains a sequence of frames. The transmitter may sample each video frame based on the viewer's foveal region and only transmit the sampled pixel data to the receiver. Upon receiving the sampled pixel data, the receiver may reconstruct the full video frame using the trained generator 640. Again, even though the pixels generated by the machine-learning model (or generator 620) may be less accurate than the actual pixels in the original video frame, there would be little or no perceptive difference to the viewer due to the viewer's foveal viewing limitations.

Figure 7:
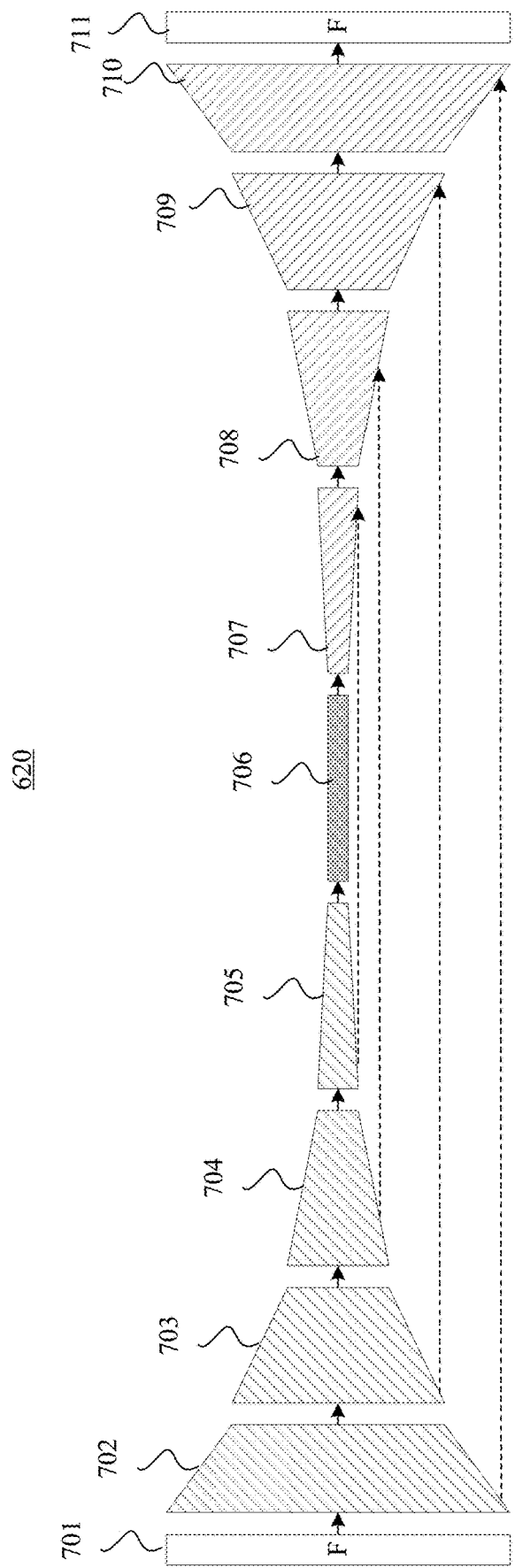
FIG. 7 illustrates example components of a generator machine-learning model, in accordance with particular embodiments.

Further details of the network architecture of the generator and discriminator are now described. In particular embodiments, the generator 620 may use a U-Net encoder-decoder with skip connection. Such a network transforms an image into a hierarchy and skip connections allow the network to bypass high frequencies and improve the gradient flow during training. FIG. 7 illustrates example components of a generator 620, in accordance with particular embodiments. In particular embodiments, the generator 620 may be an autoencoder that includes four matching encoders (e.g., 702, 703, 704, and 705) and decoder (e.g., 707, 708, 709, 710) blocks and a bottleneck block 706. While four pairs of matching encoders and decoders are illustrated in this example, any other number of pairs of matching encoders and decoders may also be used, such as three, five, seven, nine, etc. The wedge-shaped blocks indicate down-sampling and up-sampling. For example, the encoder blocks 702, 703, 704, and 705 are each represented by a wedge that starts wider on the left side than on the right, thereby representing down-sampling of the feature map. As a feature map is down-sampled, its spatial dimensions are reduced but gets deeper in the feature count. Each decoder block does the reverse of an encoder block. The decoder blocks 707, 708, 709, 710 are each represented by a wedge that starts narrower on the left side than on the right, thereby representing up-sampling of the feature map. The decoder blocks 707, 708, 709, 710 each performs a spatial bilinear up-sampling, while decreasing the feature count correspondingly to the symmetric encoder block. The input to a decoder block is the upscaled output of the previous decoder block concatenated with the output of the corresponding encoder block (skip connection, dashed arrows in FIG. 7). The up-sampling process returns the reduced dimensionality of the feature maps to their original dimensions. ELU activation functions may be used in all networks and layers (including discriminator layers) to accelerate the training.

In particular embodiments, the generator 620 may take as input an image 701 containing a sample dataset of a frame (e.g., a sparse sample of pixels of a frame or corresponding RGB pixel information of the frame and a binary mask). Four consecutive encoder blocks 702, 703, 704, 705 downscale the input RGB information in the spatial dimensions and increase the feature count. The input masks are handled using masked convolutions. The bottleneck block 706 processes the output of the last encoder layer 705 at low spatial resolution. The four matching decoder blocks 707, 708, 709, 710 perform spatial up-sampling, while decreasing the feature count. In particular embodiments, the matching encoders and decoders are connected with skip connections (e.g., represented by the arrows between symmetrical matching blocks, such as blocks 702 and 710, blocks 703 and 709, blocks 704 and 708, and blocks 705 and 707). Thus, the input to each decoder block (e.g., 709) is the output of the previous block (e.g., 708) and the masked output of the corresponding encoder block (e.g., 703). Conceptually, the skip connections help each decoding block retain the features of the sampled pixel information (as isolated using the mask). Finally, the output of the last decoder block 710 is the generated frame 711.

In particular embodiments, each consecutive encoder block (e.g., 702, 703, 704, or 705) may downscale the input spatial dimensions twice and increases the feature count. An encoder block may include two 3×3 convolutions with ELU activations. The second convolution layer may be followed by an average pooling layer. Both convolution layers in a block may have the same number of filters (e.g., 32-64-128-128 for each block, correspondingly). The bottleneck block processes the output of the last encoder layer with a low spatial resolution and operates on high-level image semantics. It may be identical to the last encoding block, except that it upsamples the input and has no skip connection.

Each decoder block (e.g., 707, 708, 709, 710) may include a 3×3 convolutional layer followed by the second spatial 3×3 convolution layer, and a bilinear upsampling layer. Each layer is followed by an ELU activation. Decoder blocks may have the same number of convolution filters as the corresponding encoder blocks (e.g., 128-128-64-32). Symmetric padding is used everywhere to prevent boundary artifacts on the image border.

Figure 8:
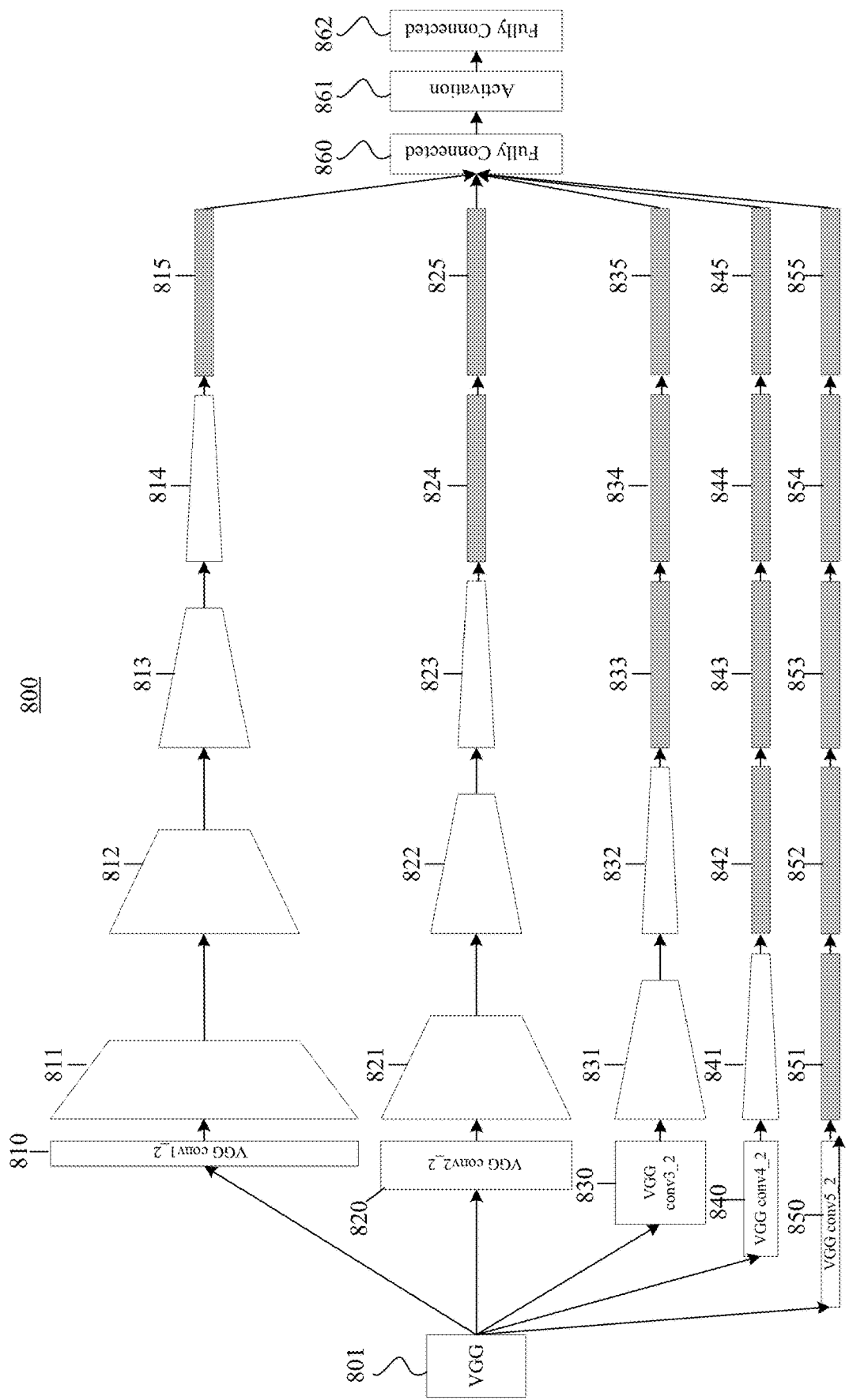
FIG. 8 illustrates example components of a discriminator machine-learning model, in accordance with particular embodiments.

FIG. 8 illustrates example components of a discriminator 800, in accordance with particular embodiments. In the embodiment shown, five intermediate layers of the pre-trained VGG network 801 (e.g., VGG-19) are each fed into a sequence of temporal residual convolutional blocks, the outputs of which are combined to yield the final scalar critic (e.g., whether the input frame is "fake"). In particular embodiments, the generated frame from the generator 620 may be fed into a pretrained VGG network 801, and the output from which may be processed by the discriminator 800. Turning to the embodiment shown in FIG. 8, the VGG neural network 801 may perform spatial reasoning on the input frame using multiple network layers. The output of each layer of the VGG neural network 801 corresponds to a different level of abstraction of the generated frame.

In particular embodiments, information that is output from five intermediate layers 810, 820, 830, 840, 850 of the VGG network 801 (or any other number of intermediate layers, such as one, three, seven, ten, etc.) may be aggregated over time by sequences of temporal residual blocks (e.g., 811-815, 821-825, 831-835, 841-845, 851-855) of the discriminator 800. In contrast to the generator 620, the discriminator 800 processes a sequence of frames at once and, therefore, can reason about space-time relations. The temporal residual blocks aggregate information over time by performing one dimensional (1D) convolutions in the temporal domain only. Turning to the example shown in FIG. 8, the output from the VGG conv1_2 layer 810 may be processed by a temporal residual block 811, which may perform a 1D temporal convolution on the input and then down-sample the spatial dimension while increasing the feature depth. This type of temporal residual block may be referred to as Type A blocks. The same operation is sequentially performed by Type A temporal residual blocks 812, 813, and 814. The output of the last temporal residual block 814 is then processed by another type of temporal residual block 815 that performs temporal convolution without down-sampling. This type of temporal residual block may be referred to as Type B blocks. The output of the Type B block 815 is then combined with outputs associated with other VGG layers (e.g., 820, 830, 840, 850) using a fully connected layer 860.

For each of the other VGG layers, the process is similar but with different numbers of Type A and Type B blocks. For example, the output of VGG conv2_2 820 is spatially smaller than the output of VGG conv1_2 810; therefore, three (rather than four) Type A blocks 821, 822, 823 are used to perform temporal convolution and down-sample until the spatial dimension of the feature map is of the desired, uniform size expected by the Type B blocks. The output of the last Type A block 823 is then processed by a sequence of two Type B blocks 824. As a result, the output of the VGG conv2_2 layer 820 undergoes a sequence of the same number of temporal convolutions (in this example, five) as that of the outputs of other VGG layers (e.g., 810, 830, 840, and 850) before reaching the fully connected layer 860. For example, the output of the VGG conv3_2 layer 830 is processed by a sequence of two Type A blocks 831, 832 and three Type B blocks 833, 834, 835. The output of the VGG conv4_2 layer 840 is processed by a sequence of one Type A block 841 and four Type B blocks 842, 843, 844, 845. The output of the VGG conv5_2 layer 850 is processed by no Type A blocks (since it is already at the desired spatial dimension) but by a sequence of five Type B blocks 851, 852, 853, 854, 855. The outputs of the last Type B block 815, 825, 835, 845, 855 for the five VGG layers 810, 820, 830, 840, 850 are then combined using the fully connected layer 860, and the output of which is processed by an activation layer 861 and then another connected layer 862 to arrive at final scalar critic (e.g., whether the frame is "fake").

Figure 9:
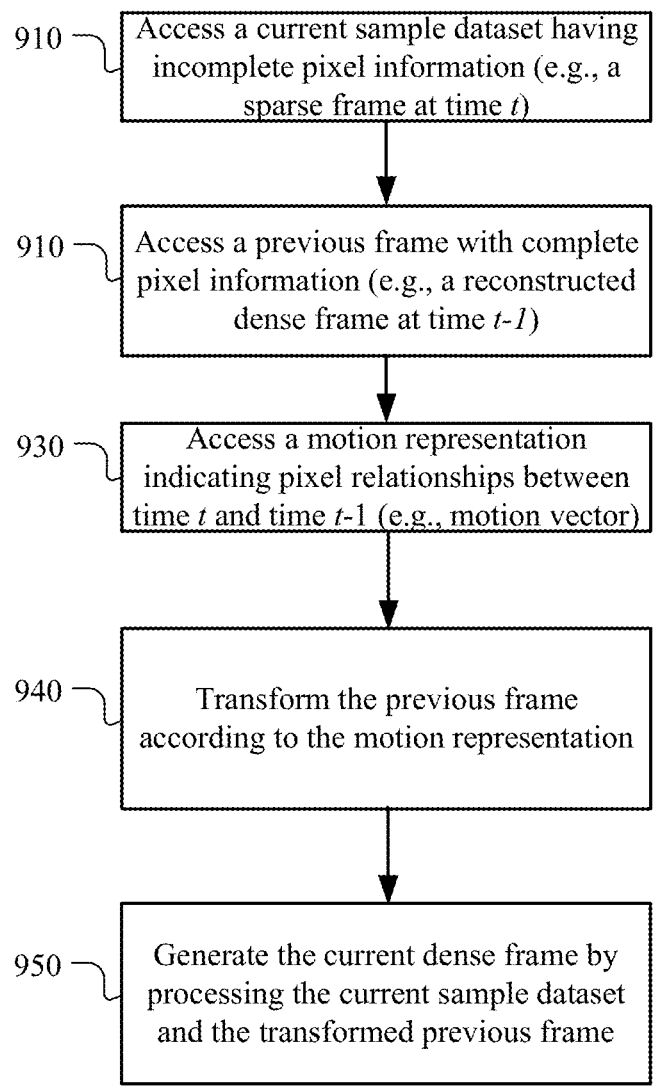
FIG. 9 illustrates an example method for generating completed images from sample datasets using the trained generator machine-learning model, in accordance with particular embodiments.

FIG. 9 illustrates an example method 900 for generating completed images from sample datasets (e.g., sparse pixel information) using a trained generator machine-learning model, in accordance with particular embodiments. The process may begin at Step 910, where a computing system may access a current sample dataset having incomplete pixel information of a current frame in a sequence of frames. The current sample dataset, for example, may be a sparse frame $S_t$ associated with time t in a sequence of frames in a video. The sparse frame $S_t$ or the incomplete pixel information of the current sample dataset may be generated by a rendering system (e.g., via ray tracing the particular pixels in $S_t$). In particular embodiments, the sparse frame $S_t$ or the incomplete pixel information may be generated by sampling a dense frame using a mask. The incomplete pixel information of the current sample dataset may include multiple regions with different pixel density. For example, a first region may have denser pixel information than a second region, in which case the first region may correspond to a foveal region of a user and the second region may be outside of the foveal region.

At step 920, the system may access a previous frame in the sequence of frames with complete pixel information. The previous frame may be a dense frame $RD_{t-1}$ associated with time t−1. In particular embodiments, the dense frame $RD_{t-1}$ may be reconstructed by a machine-learning model, such as the generator 620 as previously discussed, using a previous sparse frame $S_{t-1}$ and a reconstructed dense frame that is generated in an earlier iteration (e.g., $RD_{t-2}$).

At step 930, the system may access a motion representation indicating pixel relationships between the current frame and the previous frame. The motion representation, for example, may be a motion vector or optical flow that maps the correspondence between pixels in two sequential frames associated with time t and time t−1. For instance, the motion vectors may map one or more first pixel locations in the previous frame to one or more second pixel locations in the transformed previous frame.

As described in more detail above, the motion representation may be generated in a variety of ways. For example, the motion representation may be generated based on visibility tests performed by a rendering system for the current frame and the previous frame. For example, a dense motion vector from time t−1 to time t may be generated based on visibility tests performed for the two corresponding frames. For applications that can sacrifice quality for an improvement in speed, a machine-learning based approach may be used to generate the motion representation. For example, a dense motion vector may be generated from a sparse motion vector. The sparse motion vector may be generated by the same machine-learning model used to reconstruct the RGB frames, or it could be generated by a separate machine-learning model.

At step 940, the system may transform the previous frame according to the motion representation. For example, the previous frame $RD_{t-1}$ may be transformed to generate an estimated dense frame $ED_t$ associated with time t. For example, each pixel in $RD_{t-1}$ may be transformed to a corresponding location in $ED_t$ based on the motion representation.

At step 950, the system may generate the current frame $RD_t$, which has complete pixel information, by processing the current sample dataset (e.g., sparse frame $S_t$) and the transformed previous frame (e.g., $ED_t$) using the machine-learning model (e.g., generator 620). In particular embodiments, the complete pixel information of the generated current frame includes the incomplete pixel information of the current sample dataset $S_t$ and additional pixel information generated by the machine-learning model.

Figure 10:
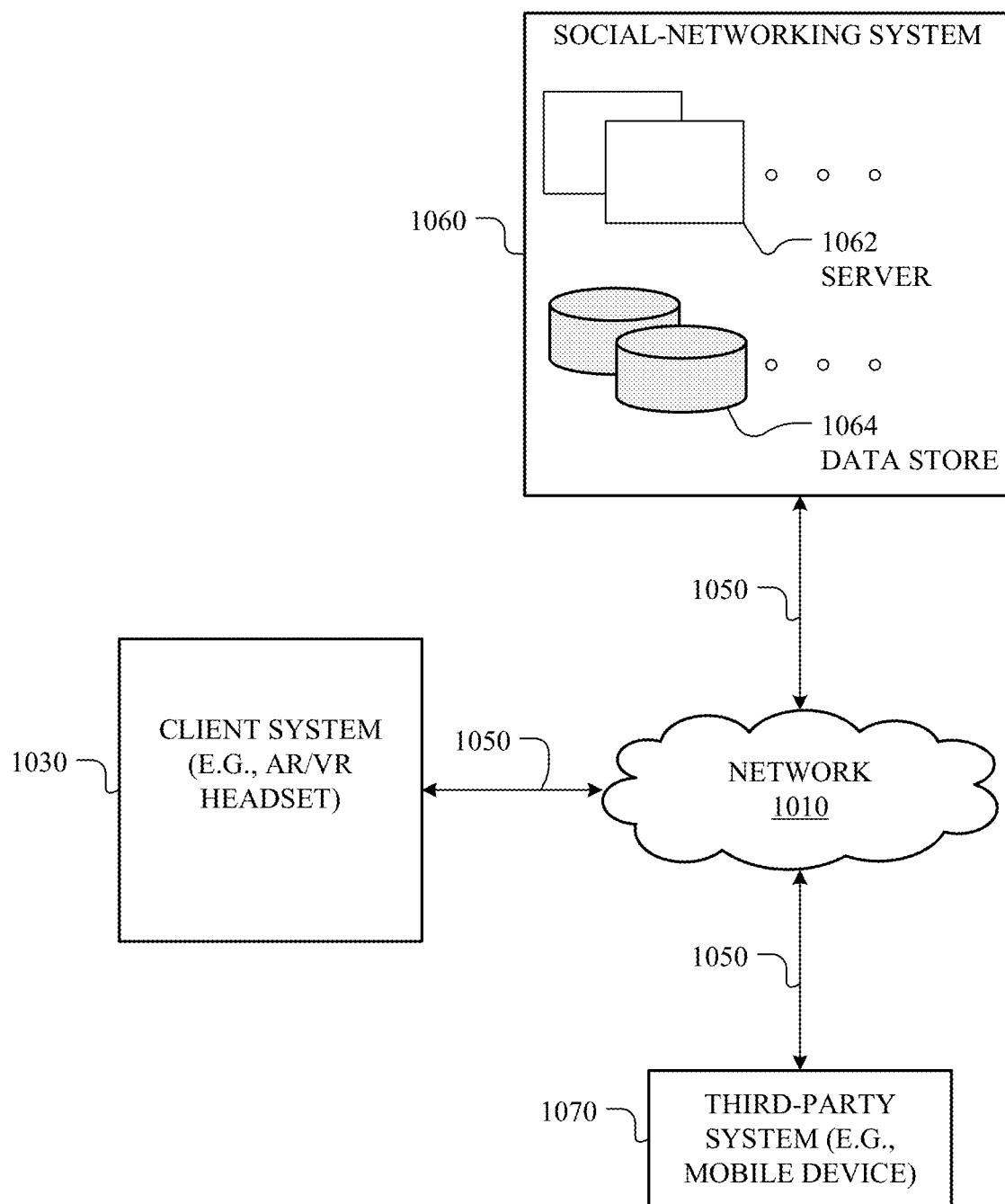
FIG. 10 illustrates an example network environment associated with a social-networking system.

FIG. 10 illustrates an example network environment 1000 associated with a social-networking system. Network environment 1000 includes a client system 1030, a social-networking system 1060, and a third-party system 1070 connected to each other by a network 1010. Although FIG. 10 illustrates a particular arrangement of client system 1030, social-networking system 1060, third-party system 1070, and network 1010, this disclosure contemplates any suitable arrangement of client system 1030, social-networking system 1060, third-party system 1070, and network 1010. As an example and not by way of limitation, two or more of client system 1030, social-networking system 1060, and third-party system 1070 may be connected to each other directly, bypassing network 1010. As another example, two or more of client system 1030, social-networking system 1060, and third-party system 1070 may be physically or logically co-located with each other in whole or in part. For example, an AR/VR headset 1030 may be connected to a local computer or mobile computing device 1070 via short-range wireless communication (e.g., Bluetooth). Moreover, although FIG. 10 illustrates a particular number of client systems 1030, social-networking systems 1060, third-party systems 1070, and networks 1010, this disclosure contemplates any suitable number of client systems 1030, social-networking systems 1060, third-party systems 1070, and networks 1010. As an example and not by way of limitation, network environment 1000 may include multiple client system 1030, social-networking systems 1060, third-party systems 1070, and networks 1010.

This disclosure contemplates any suitable network 1010. As an example and not by way of limitation, one or more portions of network 1010 may include a short-range wireless network (e.g., Bluetooth, Zigbee, etc.), an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1010 may include one or more networks 1010.

Links 1050 may connect client system 1030, social-networking system 1060, and third-party system 1070 to communication network 1010 or to each other. This disclosure contemplates any suitable links 1050. In particular embodiments, one or more links 1050 include one or more wireline (such as for example Digital Subscriber Line (DSL) or Data Over Cable Service Interface Specification (DOCSIS)), wireless (such as for example Wi-Fi, Worldwide Interoperability for Microwave Access (WiMAX), Bluetooth), or optical (such as for example Synchronous Optical Network (SONET) or Synchronous Digital Hierarchy (SDH)) links. In particular embodiments, one or more links 1050 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1050, or a combination of two or more such links 1050. Links 1050 need not necessarily be the same throughout network environment 1000. One or more first links 1050 may differ in one or more respects from one or more second links 1050.

In particular embodiments, client system 1030 may be an electronic device including hardware, software, or embedded logic components or a combination of two or more such components and capable of carrying out the appropriate functionalities implemented or supported by client system 1030. As an example and not by way of limitation, a client system 1030 may include a computer system such as a VR/AR headset, desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 1030. A client system 1030 may enable a network user at client system 1030 to access network 1010. A client system 1030 may enable its user to communicate with other users at other client systems 1030.

In particular embodiments, social-networking system 1060 may be a network-addressable computing system that can host an online social network. Social-networking system 1060 may generate, store, receive, and send social-networking data, such as, for example, user-profile data, concept-profile data, social-graph information, or other suitable data related to the online social network. Social-networking system 1060 may be accessed by the other components of network environment 1000 either directly or via network 1010. As an example and not by way of limitation, client system 1030 may access social-networking system 1060 using a web browser, or a native application associated with social-networking system 1060 (e.g., a mobile social-networking application, a messaging application, another suitable application, or any combination thereof) either directly or via network 1010. In particular embodiments, social-networking system 1060 may include one or more servers 1062. Each server 1062 may be a unitary server or a distributed server spanning multiple computers or multiple datacenters. Servers 1062 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1062 may include hardware, software, or embedded logic components or a combination of two or more such components for carrying out the appropriate functionalities implemented or supported by server 1062. In particular embodiments, social-networking system 1060 may include one or more data stores 1064. Data stores 1064 may be used to store various types of information. In particular embodiments, the information stored in data stores 1064 may be organized according to specific data structures. In particular embodiments, each data store 1064 may be a relational, columnar, correlation, or other suitable database. Although this disclosure describes or illustrates particular types of databases, this disclosure contemplates any suitable types of databases. Particular embodiments may provide interfaces that enable a client system 1030, a social-networking system 1060, or a third-party system 1070 to manage, retrieve, modify, add, or delete, the information stored in data store 1064.

In particular embodiments, social-networking system 1060 may store one or more social graphs in one or more data stores 1064. In particular embodiments, a social graph may include multiple nodes—which may include multiple user nodes (each corresponding to a particular user) or multiple concept nodes (each corresponding to a particular concept)—and multiple edges connecting the nodes. Social-networking system 1060 may provide users of the online social network the ability to communicate and interact with other users. In particular embodiments, users may join the online social network via social-networking system 1060 and then add connections (e.g., relationships) to a number of other users of social-networking system 1060 to whom they want to be connected. Herein, the term "friend" may refer to any other user of social-networking system 1060 with whom a user has formed a connection, association, or relationship via social-networking system 1060.

In particular embodiments, social-networking system 1060 may provide users with the ability to take actions on various types of items or objects, supported by social-networking system 1060. As an example and not by way of limitation, the items and objects may include groups or social networks to which users of social-networking system 1060 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 1060 or by an external system of third-party system 1070, which is separate from social-networking system 1060 and coupled to social-networking system 1060 via a network 1010.

In particular embodiments, social-networking system 1060 may be capable of linking a variety of entities. As an example and not by way of limitation, social-networking system 1060 may enable users to interact with each other as well as receive content from third-party systems 1070 or other entities, or to allow users to interact with these entities through an application programming interfaces (API) or other communication channels.

In particular embodiments, a third-party system 1070 may include a local computing device that is communicatively coupled to the client system 1030. For example, if the client system 1030 is an AR/VR headset, the third-party system 1070 may be a local laptop configured to perform the necessary graphics rendering and provide the rendered results to the AR/VR headset 1030 for subsequent processing and/or display. In particular embodiments, the third-party system 1070 may execute software associated with the client system 1030 (e.g., a rendering engine). The third-party system 1070 may generate sample datasets with sparse pixel information of video frames and send the sparse data to the client system 1030. The client system 1030 may then generate frames reconstructed from the sample datasets.

In particular embodiments, the third-party system 1070 may also include one or more types of servers, one or more data stores, one or more interfaces, including but not limited to APIs, one or more web services, one or more content sources, one or more networks, or any other suitable components, e.g., that servers may communicate with. A third-party system 1070 may be operated by a different entity from an entity operating social-networking system 1060. In particular embodiments, however, social-networking system 1060 and third-party systems 1070 may operate in conjunction with each other to provide social-networking services to users of social-networking system 1060 or third-party systems 1070. In this sense, social-networking system 1060 may provide a platform, or backbone, which other systems, such as third-party systems 1070, may use to provide social-networking services and functionality to users across the Internet.

In particular embodiments, a third-party system 1070 may include a third-party content object provider (e.g., including sparse sample datasets described herein). A third-party content object provider may include one or more sources of content objects, which may be communicated to a client system 1030. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 1060 also includes user-generated content objects, which may enhance a user's interactions with social-networking system 1060. User-generated content may include anything a user can add, upload, send, or "post" to social-networking system 1060. As an example and not by way of limitation, a user communicates posts to social-networking system 1060 from a client system 1030. Posts may include data such as status updates or other textual data, location information, photos, videos, links, music or other similar data or media. Content may also be added to social-networking system 1060 by a third-party through a "communication channel," such as a newsfeed or stream.

In particular embodiments, social-networking system 1060 may include a variety of servers, sub-systems, programs, modules, logs, and data stores. In particular embodiments, social-networking system 1060 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 1060 may also include suitable components such as network interfaces, security mechanisms, load balancers, failover servers, management-and-network-operations consoles, other suitable components, or any suitable combination thereof. In particular embodiments, social-networking system 1060 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 1060 to one or more client systems 1030 or one or more third-party system 1070 via network 1010. The web server may include a mail server or other messaging functionality for receiving and routing messages between social-networking system 1060 and one or more client systems 1030. An API-request server may allow a third-party system 1070 to access information from social-networking system 1060 by calling one or more APIs. An action logger may be used to receive communications from a web server about a user's actions on or off social-networking system 1060. In conjunction with the action log, a third-party-content-object log may be maintained of user exposures to third-party-content objects. A notification controller may provide information regarding content objects to a client system 1030. Information may be pushed to a client system 1030 as notifications, or information may be pulled from client system 1030 responsive to a request received from client system 1030. Authorization servers may be used to enforce one or more privacy settings of the users of social-networking system 1060. A privacy setting of a user determines how particular information associated with a user can be shared. The authorization server may allow users to opt in to or opt out of having their actions logged by social-networking system 1060 or shared with other systems (e.g., third-party system 1070), such as, for example, by setting appropriate privacy settings. Third-party-content-object stores may be used to store content objects received from third parties, such as a third-party system 1070. Location stores may be used for storing location information received from client systems 1030 associated with users. Advertisement-pricing modules may combine social information, the current time, location information, or other suitable information to provide relevant advertisements, in the form of notifications, to a user.

Figure 11:
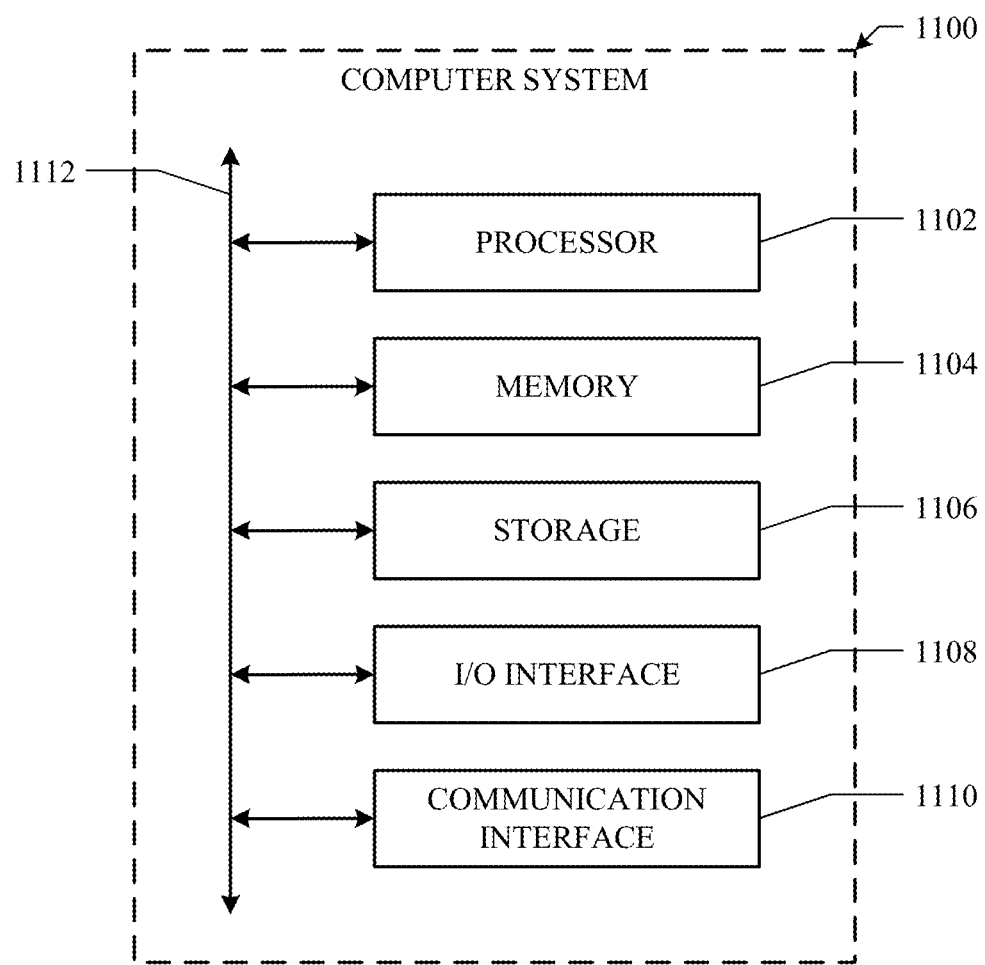
FIG. 11 illustrates an example computer system.

FIG. 11 illustrates an example computer system 1100. In particular embodiments, one or more computer systems 1100 perform one or more steps of one or more methods described or illustrated herein. In particular embodiments, one or more computer systems 1100 provide functionality described or illustrated herein. In particular embodiments, software running on one or more computer systems 1100 performs one or more steps of one or more methods described or illustrated herein or provides functionality described or illustrated herein. Particular embodiments include one or more portions of one or more computer systems 1100. Herein, reference to a computer system may encompass a computing device, and vice versa, where appropriate. Moreover, reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 1100 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 for instructions executing at processor 1102 to operate on; the results of previous instructions executed at processor 1102 for access by subsequent instructions executing at processor 1102 or for writing to memory 1104 or storage 1106; or other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs); be a multi-core processor; or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as, for example, another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:
1. A method comprising, by a computing system:
   accessing a current sample dataset having incomplete pixel information of a current frame in a sequence of frames, wherein the current sample dataset is generated based on a corresponding binary mask, wherein the corresponding binary mask represents whether color information for each pixel in the current frame is sampled;
accessing at least one previous frame in the sequence of frames with complete pixel information;
accessing a motion representation indicating pixel relationships between the current frame and the previous frame;
transforming the previous frame according to the motion representation;
accessing a first machine-learning model;
providing the current sample dataset, the corresponding binary mask, and the transformed previous frame as inputs to the first machine-learning model; and
generating the current frame by processing the current sample dataset and the transformed previous frame using the first machine-learning model, wherein the generated current frame has complete pixel information.

2. The method of claim 1, wherein the complete pixel information of the generated current frame includes the incomplete pixel information of the current sample dataset and additional pixel information generated by the first machine-learning model.

3. The method of claim 1, wherein the incomplete pixel information of the current sample dataset is generated by a rendering system.

4. The method of claim 1, wherein:
the incomplete pixel information of the current sample dataset includes a first region and a second region;
the first region has denser pixel information than the second region; and
the first region corresponds to a foveal region of a user and the second region is outside of the foveal region.

5. The method of claim 1, wherein the previous frame with complete pixel information is generated using the first machine-learning model and a previous sample dataset having incomplete pixel information of the previous frame.

6. The method of claim 1, wherein the motion representation maps one or more first pixel locations in the previous frame to one or more second pixel locations in the transformed previous frame.

7. The method of claim 1, wherein:
the motion representation is generated based on visibility tests performed by a rendering system for the current frame and the previous frame.

8. The method of claim 1, further comprising:
generating the motion representation by processing an incomplete motion representation using a second machine-learning model.

9. The method of claim 1, wherein
the motion representation is generated by processing an incomplete motion representation using the first machine-learning model.

10. One or more computer-readable non-transitory storage media embodying software that is operable when executed to:
access a current sample dataset having incomplete pixel information of a current frame in a sequence of frames, wherein the current sample dataset is generated based on a corresponding binary mask, wherein the corresponding binary mask represents whether color information for each pixel in the current frame is sampled;
access at least one previous frame m the sequence of frames with complete pixel information;
access a motion representation indicating pixel relationships between the current frame and the previous frame;
transform the previous frame according to the motion representation;
access a first machine-learning model;
provide the current sample dataset, the corresponding binary mask, and the transformed previous frame as inputs to the first machine-learning model; and
generate the current frame by processing the current sample dataset and the transformed previous frame using the first machine-learning model, wherein the generated current frame has complete pixel information.

11. The media of claim 10, wherein the complete pixel information of the generated current frame includes the incomplete pixel information of the current sample dataset and additional pixel information generated by the first machine-learning model.

12. The media of claim 10, wherein the incomplete pixel information of the current sample dataset is generated by a rendering system.

13. The media of claim 10, wherein:
the incomplete pixel information of the current sample dataset includes a first region and a second region;
the first region has denser pixel information than the second region; and
the first region corresponds to a foveal region of a user and the second region is outside of the foveal region.

14. The media of claim 10, wherein the previous frame with complete pixel information is generated using the first machine-learning model and a previous sample dataset having incomplete pixel information of the previous frame.

15. The media of claim 10, wherein the motion representation maps one or more first pixel locations in the previous frame to one or more second pixel locations in the transformed previous frame.

16. A system comprising: one or more processors; and one or more computer-readable non-transitory storage media coupled to one or more of the processors and comprising instructions operable when executed by one or more of the processors to cause the system to:
access a current sample dataset having incomplete pixel information of a current frame in a sequence of frames, wherein the current sample dataset is generated based on a corresponding binary mask, wherein the corresponding binary mask represents whether color information for each pixel in the current frame is sampled;
access at least one previous frame m the sequence of frames with complete pixel information;
access a motion representation indicating pixel relationships between the current frame and the previous frame;
transform the previous frame according to the motion representation;
access a first machine-learning model;
provide the current sample dataset, the corresponding binary mask, and the transformed previous frame as inputs to the first machine-learning model; and
generate the current frame by processing the current sample dataset and the transformed previous frame using the first machine-learning model, wherein the generated current frame has complete pixel information.

17. The system of claim 16, wherein the complete pixel information of the generated current frame includes the incomplete pixel information of the current sample dataset and additional pixel information generated by the first machine-learning model.

18. The system of claim 16, wherein the incomplete pixel information of the current sample dataset is generated by a rendering system.

19. The system of claim 16, wherein:
the incomplete pixel information of the current sample dataset includes a first region and a second region;
the first region has denser pixel information than the second region; and
the first region corresponds to a foveal region of a user and the second region is outside of the foveal region.

20. The system of claim 16, wherein the previous frame with complete pixel information is generated using the first machine-learning model and a previous sample dataset having incomplete pixel information of the previous frame.

* * * * *